US012572859B2

(12) United States Patent
Cartwright et al.

(10) Patent No.: US 12,572,859 B2
(45) Date of Patent: Mar. 10, 2026

(54) TAGGING OF ASSETS FOR CONTENT DISTRIBUTION IN AN ENTERPRISE MANAGEMENT SYSTEM

(71) Applicant: ILLINOIS TOOL WORKS INC., Glenview, IL (US)

(72) Inventors: Richard W. Cartwright, Piqua, OH (US); Jennifer L. Smith, Clayton, OH (US); Joshua B. Murphy, Columbus, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 544 days.

(21) Appl. No.: 16/446,771

(22) Filed: Jun. 20, 2019

(65) Prior Publication Data

US 2019/0303817 A1 Oct. 3, 2019

Related U.S. Application Data

(63) Continuation of application No. 14/363,876, filed as application No. PCT/US2012/069816 on Dec. 14, 2012, now Pat. No. 10,332,045.

(Continued)

(51) Int. Cl.
*G06Q 10/0631* (2023.01)
*G06Q 10/101* (2023.01)
(Continued)

(52) U.S. Cl.
CPC ....... *G06Q 10/0631* (2013.01); *G06Q 10/101* (2013.01); *G06Q 50/01* (2013.01);
(Continued)

(58) Field of Classification Search
CPC .. H04N 7/173; H04N 21/472; H04L 65/4084; G16Y 40/35
See application file for complete search history.

(56) References Cited

U.S. PATENT DOCUMENTS

| 678,906 A | 7/1901 | Rogers |
| 5,875,430 A | 2/1999 | Koether |
| | (Continued) | |

FOREIGN PATENT DOCUMENTS

| CN | 1285485 A | 2/2001 |
| CN | 101116051 A | 1/2008 |
| | (Continued) | |

OTHER PUBLICATIONS

S. Reichel, T. Muller, O. Stamm, F. Groh, B. Wiedersheim and M. Weber, "MAMPF: An Intelligent Cooking Agent for Zoneless Stoves," 2011 Seventh International Conference on Intelligent Environments, Nottingham, UK, 2011, pp. 171-178, doi: 10.1109/IE. 2011.18. (Year: 2011).*

(Continued)

*Primary Examiner* — Jerry O'Connor
*Assistant Examiner* — Jeremy L Gunn
(74) *Attorney, Agent, or Firm* — Burr & Forman

(57) ABSTRACT

A content distribution platform may include processing circuitry having a processor and memory. The memory may store a plurality of content items associated with at least one content library. The processor may be configured to enable assignment of tags to the food preparation assets. Each tag may define an association between a respective one of the assets and a characteristic of the respective one of the assets to enable the content distribution platform to distribute the content items on the basis of the tags.

19 Claims, 17 Drawing Sheets

Related U.S. Application Data

(60) Provisional application No. 61/576,560, filed on Dec. 16, 2011.

(51) Int. Cl.
| | |
|---|---|
| *G06Q 50/00* | (2012.01) |
| *H04L 65/1073* | (2022.01) |
| *H04L 65/403* | (2022.01) |
| *H04L 67/10* | (2022.01) |

(52) U.S. Cl.
CPC ........ *H04L 65/1073* (2013.01); *H04L 65/403* (2013.01); *H04L 67/10* (2013.01); *Y02P 90/80* (2015.11)

(56) References Cited

U.S. PATENT DOCUMENTS

| | | | | |
|---|---|---|---|---|
| 6,204,763 | B1 | 3/2001 | Sone | |
| 6,532,368 | B1 | 3/2003 | Hild et al. | |
| 6,789,067 | B1 | 9/2004 | Liebenow | |
| 6,949,729 | B1 * | 9/2005 | Ishikawa | H05B 6/688 |
| | | | | 700/211 |
| 7,092,988 | B1 * | 8/2006 | Bogatin | H04L 67/025 |
| | | | | 700/211 |
| 7,210,625 | B2 | 5/2007 | McNutt et al. | |
| 8,712,851 | B2 * | 4/2014 | Koether | G06Q 10/087 |
| | | | | 705/15 |
| 8,892,482 | B2 * | 11/2014 | Cheng | G06Q 10/06 |
| | | | | 706/13 |
| 9,081,779 | B2 | 7/2015 | Gupta | |
| 10,748,156 | B2 * | 8/2020 | Hunter | G06Q 30/00 |
| 2002/0030051 | A1 | 3/2002 | Thorneywork | |
| 2002/0120502 | A1 | 8/2002 | Sakaguchi | |
| 2004/0099144 | A1 | 5/2004 | Kudo et al. | |
| 2004/0249655 | A1 | 12/2004 | Doeberl et al. | |
| 2005/0038536 | A1 | 2/2005 | D'Mura | |
| 2005/0203917 | A1 * | 9/2005 | Freeberg | H04L 67/06 |
| 2005/0289017 | A1 | 12/2005 | Gershom | |
| 2006/0011716 | A1 | 1/2006 | Perkowski | |
| 2006/0261948 | A1 * | 11/2006 | Czyszczewski | G06Q 10/087 |
| | | | | 340/572.1 |
| 2007/0050229 | A1 | 3/2007 | Tatro et al. | |
| 2007/0061487 | A1 | 3/2007 | Moore et al. | |
| 2007/0150371 | A1 | 6/2007 | Ganji | |
| 2007/0285241 | A1 * | 12/2007 | Griebenow | G06Q 50/40 |
| | | | | 340/572.1 |
| 2007/0294129 | A1 | 12/2007 | Froseth et al. | |
| 2008/0071901 | A1 | 3/2008 | Adelman et al. | |
| 2008/0195664 | A1 | 8/2008 | Maharajh et al. | |
| 2008/0201305 | A1 | 8/2008 | Fitzpatrick et al. | |
| 2010/0030578 | A1 | 2/2010 | Siddique et al. | |
| 2010/0122306 | A1 * | 5/2010 | Pratt | H04N 21/6125 |
| | | | | 725/86 |
| 2010/0192784 | A1 | 8/2010 | Shim et al. | |
| 2010/0213187 | A1 | 8/2010 | Bandholz et al. | |
| 2010/0258643 | A1 | 10/2010 | Glielmo et al. | |
| 2010/0262449 | A1 | 10/2010 | Monteforte et al. | |
| 2011/0006054 | A1 | 1/2011 | Garcia | |
| 2011/0213667 | A1 | 9/2011 | Ierullo | |
| 2011/0218957 | A1 | 9/2011 | Coon et al. | |
| 2012/0044089 | A1 * | 2/2012 | Yarnold | H04W 12/088 |
| | | | | 340/901 |
| 2012/0072463 | A1 * | 3/2012 | Moganti | G06Q 30/0276 |
| | | | | 707/E17.005 |
| 2012/0150681 | A1 | 6/2012 | Yu et al. | |
| 2012/0179585 | A1 | 7/2012 | Guzzo et al. | |
| 2012/0265694 | A1 * | 10/2012 | Tuchman | G06Q 10/02 |
| | | | | 705/304 |
| 2013/0052616 | A1 | 2/2013 | Silverstein et al. | |
| 2013/0092032 | A1 * | 4/2013 | Cafferty | F24C 7/08 |
| | | | | 99/325 |
| 2013/0097306 | A1 * | 4/2013 | Dhunay | H04L 12/6418 |
| | | | | 709/224 |
| 2013/0124617 | A1 * | 5/2013 | Lee | G06F 15/16 |
| | | | | 709/203 |

FOREIGN PATENT DOCUMENTS

| | | | | |
|---|---|---|---|---|
| CN | 102164526 | A | 8/2011 | |
| CN | 102201088 | A | 9/2011 | |
| EP | 2769150 | B1 * | 12/2018 | ........... A47J 36/321 |
| WO | 2009143109 | A1 | 11/2009 | |
| WO | 2011075763 | A1 | 6/2011 | |

OTHER PUBLICATIONS

Svennson, Martin et al., "Designing and Evaluating Kalas: A Social Navigation System for Food Recipes," ACM Transactions on Computer-Human Interaction, Sep. 2005, vol. 12, No. 3., pp. 374-400.

International Search Report and Written Opinion of PCT/US2012/069788 mailed on Jun. 18, 2013, all enclosed pages cited.

Chapter 1 International Preliminary Report on Patentability of PCT/US2012/069828 mailed on Jun. 17, 2014, all enclosed pages cited.

Extended European Search Report and Written Opinion of corresponding European Application No. 12809505.6, mailed Oct. 7, 2015, all enclosed pages cited.

Office Action for corresponding U.S. Appl. No. 14/362,928 dated Mar. 8, 2017.

Office Action for corresponding U.S. Appl. No. 14/362,937 dated Mar. 13, 2017.

Examination report of corresponding European application No. 12812773.5 mailed Nov. 2, 2017, all enclosed pages cited.

Supplemental Search Report from corresponding Chinese application No. 201280070046.X mailed Jan. 4, 2018, all enclosed pages cited.

Examination report from corresponding Chinese application No. 201280070046.X mailed Jan. 12, 2018, all enclosed pages cited.

International Search Report and Written Opinion of PCT/US2012/069816 mailed on Apr. 8, 2013, all enclosed pages cited.

Chapter 1 International Preliminary Report on Patentability of PCT/US2012/069816 mailed on Jun. 17, 2014, all enclosed pages cited.

International Search Report and Written Opinion of PCT/US2012/069774 mailed on Jun. 3, 2013, all enclosed pages cited.

International Search Report and Written Opinion of PCT/US2012/069828 mailed on Jun. 6, 2013, all enclosed pages cited.

Non-Final Rejection issued in corresponding U.S. Appl. No. 14/362,928 on May 13, 2021, all enclosed pages cited.

First office Action from corresponding CN Application No. 202111612063.9, mailed Mar. 26, 2025, all pages cited in its entirety.

* cited by examiner

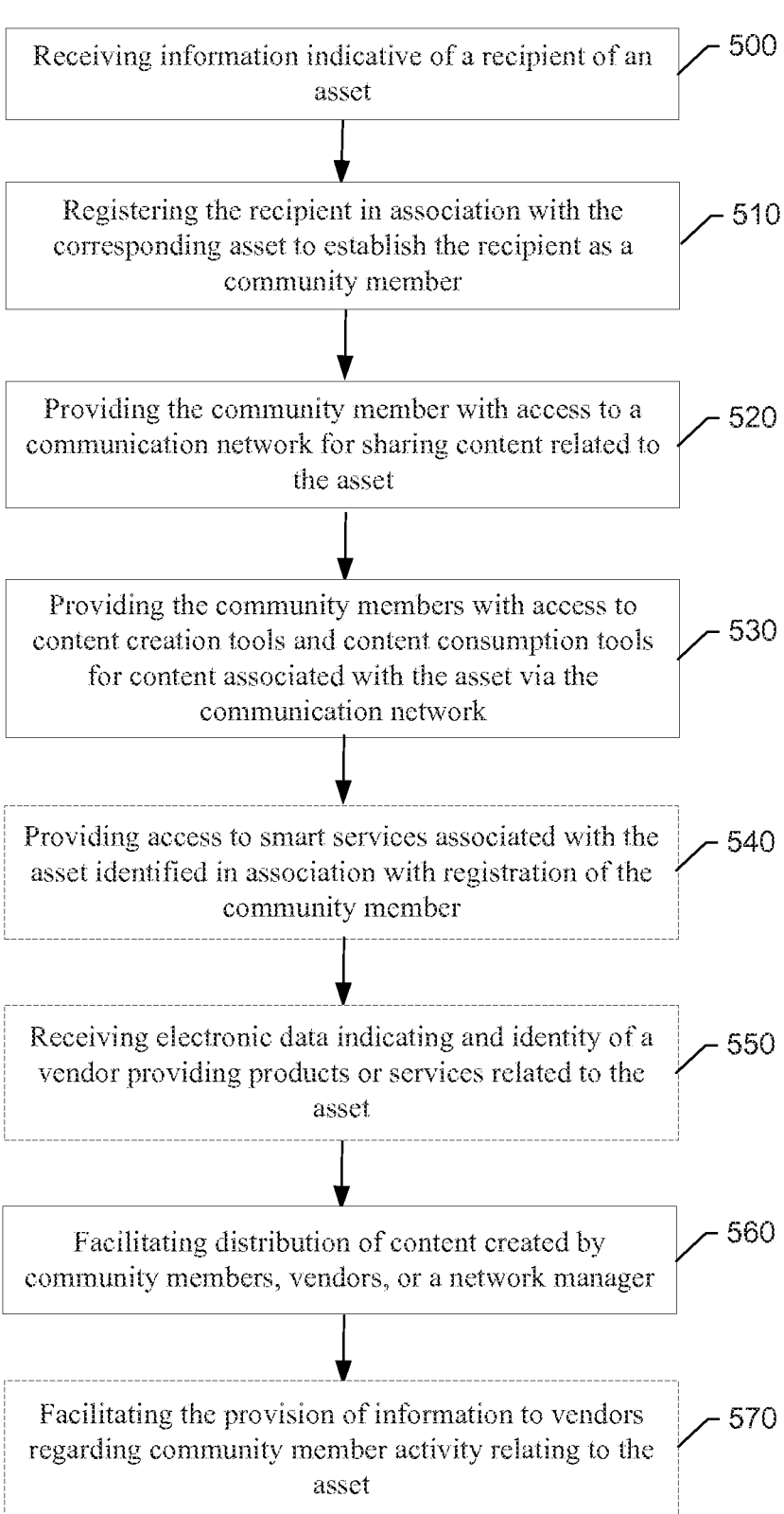

Receiving information indicative of a recipient of an asset — 500

Registering the recipient in association with the corresponding asset to establish the recipient as a community member — 510

Providing the community member with access to a communication network for sharing content related to the asset — 520

Providing the community members with access to content creation tools and content consumption tools for content associated with the asset via the communication network — 530

Providing access to smart services associated with the asset identified in association with registration of the community member — 540

Receiving electronic data indicating and identity of a vendor providing products or services related to the asset — 550

Facilitating distribution of content created by community members, vendors, or a network manager — 560

Facilitating the provision of information to vendors regarding community member activity relating to the asset — 570

FIG. 14

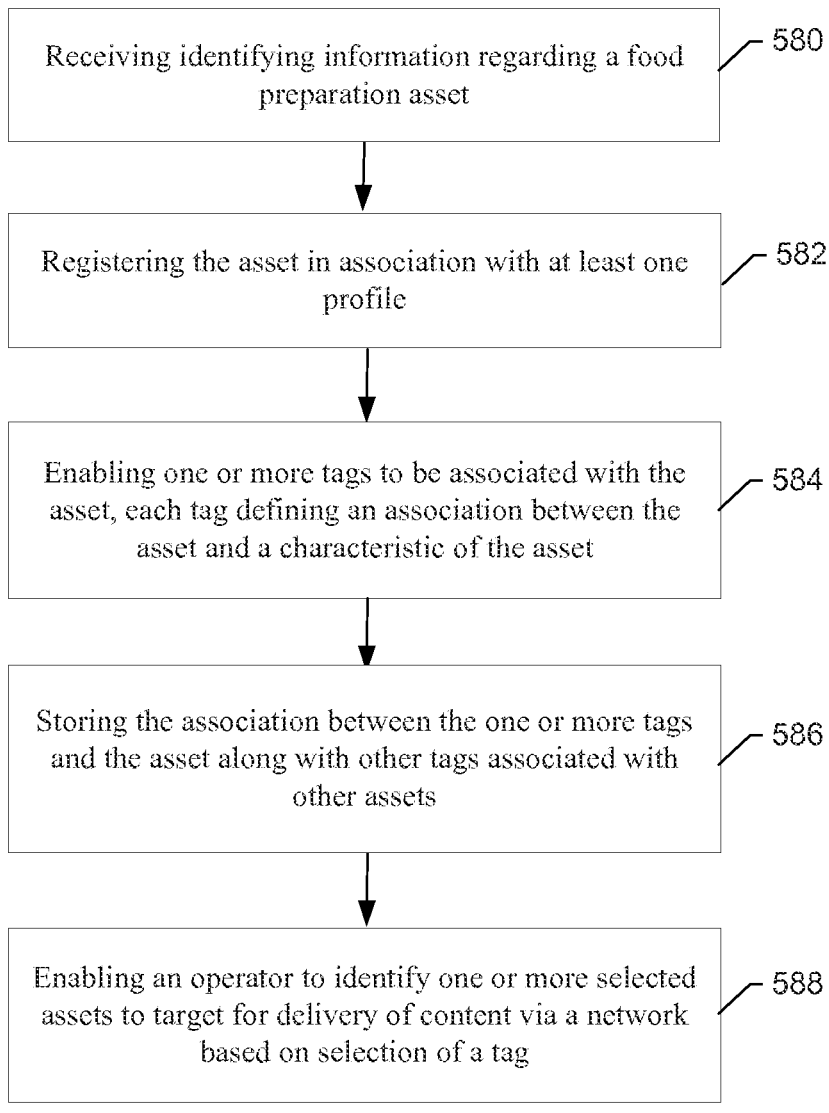

Receiving identifying information regarding a food preparation asset — 580

Registering the asset in association with at least one profile — 582

Enabling one or more tags to be associated with the asset, each tag defining an association between the asset and a characteristic of the asset — 584

Storing the association between the one or more tags and the asset along with other tags associated with other assets — 586

Enabling an operator to identify one or more selected assets to target for delivery of content via a network based on selection of a tag — 588

FIG. 15

TAGGING OF ASSETS FOR CONTENT DISTRIBUTION IN AN ENTERPRISE MANAGEMENT SYSTEM

CROSS REFERENCE TO RELATED APPLICATIONS

This application claims the benefit of U.S. Provisional Application No. 61/576,560, filed Dec. 16, 2011, the contents of which are incorporated herein in their entirety.

TECHNICAL FIELD

Example embodiments generally relate to enterprise management and, more particularly, relate to the distribution of recipe or other food product related information associated with a particular asset in the context of a communication network.

BACKGROUND

Many food service companies are enterprises which conduct operations at numerous locations, some of which may be in different geographic regions. However, such companies often strive to provide consistency and quality across the entirety of their organization. To achieve consistency and quality, many such enterprises generate recipes and/or processes to standardize the use of equipment that is shared across the enterprise for use in food preparation.

While standardization of certain processes and/or recipes may have some advantages, it may also be desirable to foster the proliferation of creative processes and technical improvements. Moreover, many chefs are inquisitive and creative by nature as well as being familiar with the creation and consumption of content associated with modern network communication tools such as social networking sites, blogs, and/or the like. Thus, it may be desirable to implement network communication tools into enterprise management for food service companies.

BRIEF SUMMARY OF SOME EXAMPLES

Some example embodiments may provide an enterprise management system that may enable enterprise wide sharing of content to improve utilization of network assets. In one example, a particular network asset such as an oven that may employ multiple cooking sources that are electronically controlled via processing circuitry may be a focal point of such a system. In this regard, for example, ovens may be distributed to numerous customers. In some cases, a plurality of ovens may be provided to individual customers with standard (e.g., company generated) recipes and/or cooking signatures being provided to operators (e.g., chefs) from the corporate level. The operators may be enabled, either directly via the ovens or via other computer based access terminals, to communicate with each other, with the organizational leadership, or enterprise management entities in order to share content such as recipes and/or cooking signatures across the enterprise relating to the ovens. In some embodiments, a mechanism for tagging assets may be provided so that targeted searching for assets may be accomplished, or so that targeted content distribution may be accomplished. The system may therefore enable standardization to be provided by company driven dissemination of procedures, recipes and/or cooking signatures. However, feedback and process improvement data may also be easily shared throughout the system to enable synergistic cooperation across the enterprise. Furthermore, such a system may enable integration with other parties outside the organization, such as distributors, manufacturers, or even professionals from other food service companies, which could be either competitors or partners. The network asset, such as the oven, may therefore become the focal point for a network of parties that service or use the oven in one way or another to share in a cooperative experience that can be mutually beneficial to all parties.

In an example embodiment, a content distribution platform may be provided. The platform may include processing circuitry having a processor and memory. The memory may store a plurality of content items associated with at least one content library. The processor may be configured to enable assignment of tags to the food preparation assets. Each tag may define an association between a respective one of the assets and a characteristic of the respective one of the assets to enable the content distribution platform to distribute the content items on the basis of the tags.

In another example embodiment, a content distribution system in an enterprise management network is provided. The system may include a content distribution platform and a plurality of food preparation assets. The content distribution platform may include processing circuitry. The content distribution platform may host at least one content library that includes a plurality of content items related to food preparation. The plurality of food preparation assets may be in communication with the content distribution platform via the network. The processing circuitry of the content distribution platform may be configured to enable assignment of tags to the food preparation assets. Each tag may define an association between a respective one of the assets and a characteristic of the respective one of the assets to enable the content distribution platform to distribute the content items on the basis of the tags.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 14 illustrates a block diagram of a method according to an example embodiment;

FIG. 15 illustrates a method of tagging assets to enable targeted content or service delivery according to an example embodiment;

DETAILED DESCRIPTION

Figure 1:
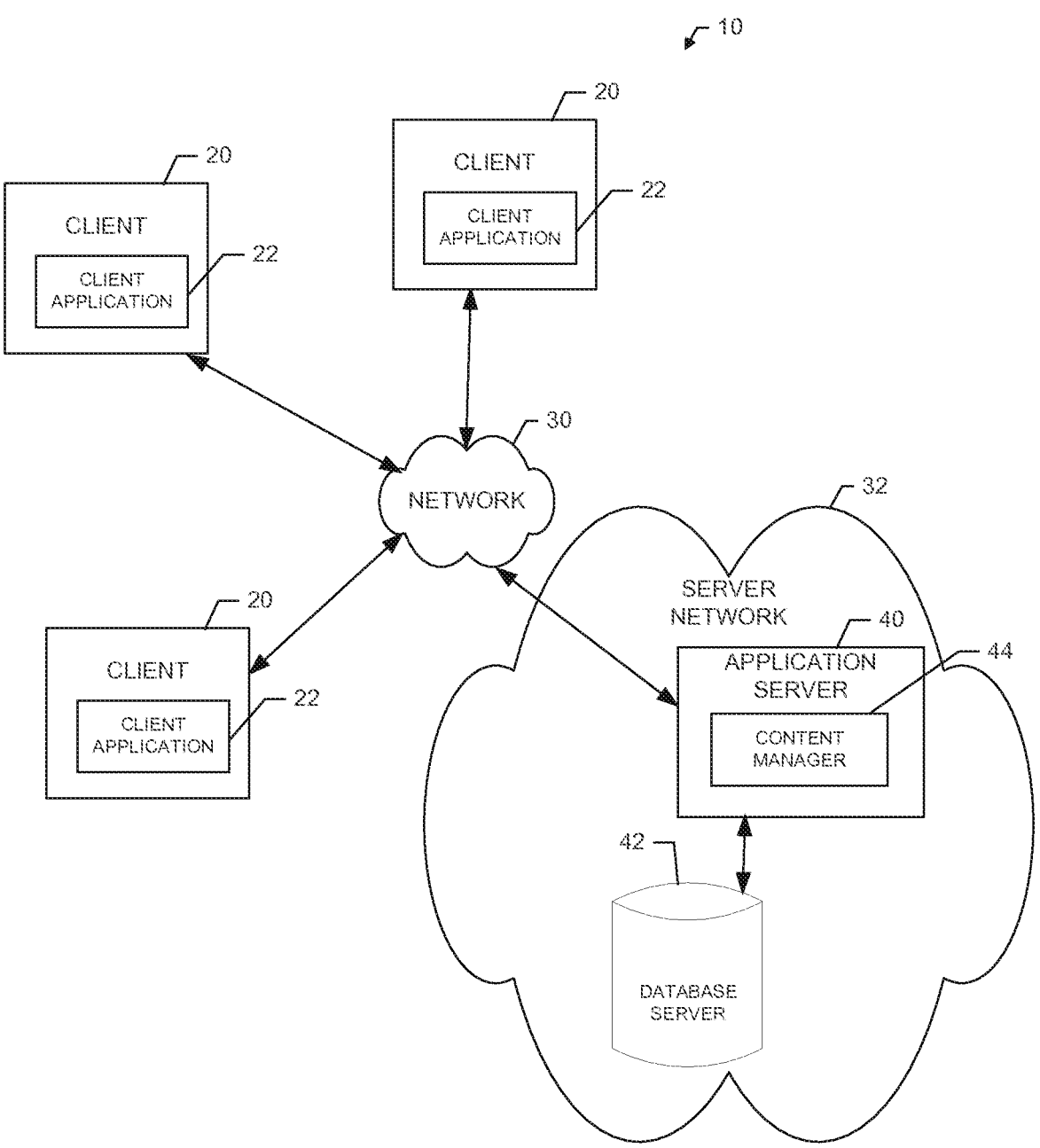
FIG. 1 illustrates a functional block diagram of a system for provision of oven related content or information according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may provide an enterprise management system that may enable enterprise wide sharing of content to improve utilization of network assets. Moreover, some example embodiments may provide a system via which content may be shared relating to a particular network asset (e.g., food preparation related equipment such as an oven, holding cabinet, fryer, food weighing equipment, refrigerator, or other food cooling, heating or food processing appliances). The content sharing may be accomplished via a network based system employing tools enabling collaborative, instructive, and/or interactive content publication or distribution. The result of establishing the network based system may be the provision of a set of online tools that can be leveraged for enterprise level management of assets and content generated that relates to the assets. As such, for example, recipes, cooking signatures and other content created relative to the employment of the asset may be shared throughout the enterprise. Moreover, management of the asset itself (e.g., diagnostics, service, training, and/or the like) may also be accomplished using the online tools provided. In some embodiments, the enterprise may also engage distributors, customers, service organizations or other partners into synergistic partnerships relative to the asset. A complete ecosystem for interaction of all users, consumers, servicers and suppliers of the asset may therefore be provided to facilitate use, maintenance, training, distribution of supplies, and other activities that are related to the asset.

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that many more clients 20 may be included in some embodiments and thus, the three clients 20 of FIG. 1 are simply used to illustrate a multiplicity of clients 20 and the number of clients 20 is in no way limiting to other example embodiments. In this regard, example embodiments are scalable to inclusion of any number of clients 20 being tied into the system 10. The example described herein will be related to an asset comprising an oven to illustrate one example embodiment. However, it should be appreciated that example embodiments may also apply to any asset including, for example, any of the assets listed above or other food preparation related equipment.

The clients 20 may, in some cases, each be associated with a single oven, or a group of ovens, which may be owned, leased, or otherwise employed by an organization. In some embodiments, each of the clients 20 may be associated with different corresponding locations within a single food service company. For example, among the clients 20, one client may be associated with a first facility of a first organization (e.g., a food service company that prepares or cooks food using the oven) and all of the ovens of a particular type that are associated with the first facility. Meanwhile, a second client may be associated with a second facility of the first organization and all of the ovens of a particular type that are associated with the second facility. As an alternative, each client 20 may be associated with a single corresponding oven. In still other embodiments, each client 20 may actually be incorporated into respective ones of the ovens.

In other examples, some of the clients 20 may be associated with the first organization, while other ones of the clients 20 are associated with a second organization (again with individual ones clients 20 being associated with or embodied at one of the ovens, or a group of ovens. As such, in some cases, multiple clients 20 may be associated with the same organization. However, a single oven could be associated with some or all of the organizations in other embodiments.

Each one of the clients 20 may include or otherwise be embodied as computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption at the clients 20). As such, for example, the client application 22 may include corresponding executable instructions for configuring the client 20 to provide corresponding functionalities as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the ovens with which the clients 20 are associated. For example, the application server 40 may be configured to provide cooking signatures, recipes and/or the like to clients 20 for use with the ovens associated with the clients. Alternatively or additionally, the application server 40 may be configured to provide diagnostic or troubleshooting information for servicing of the ovens, or to provide training information for procedures relating to the care or use of the ovens. In some embodiments, the application server 40 may be further configured to provide social networking type interaction among the clients 20 (e.g., posting comments, message, or content to be shared with other clients 20). In still other embodiments, the application server 40 may be configured to provide access for food manufacturers and/or distributors to publish or consume content and interact with the clients 20. As such, in at least one example, a food manufacturer or distributor may be associated with one of the clients 20.

In some embodiments, for example, the application server 40 may therefore include an instance of a content manager 44 comprising stored instructions for handling activities associated with practicing example embodiments as described herein. As such, in some embodiments, the clients 20 may access the content manager 44 online and utilize the services provided thereby relating to creation of and/or consumption of content items. However, it should be appreciated that in other embodiments, the content manager 44 may be provided from the application server 40 (e.g., via download over the network 30) to one or more of the clients 20 to enable recipient clients to instantiate an instance of the content manager 44 for local operation. As yet another example, the content manager 44 may be instantiated at one or more of the clients 20 responsive to downloading instructions from a removable or transferable memory device carrying instructions for instantiating the content manager 44 at the corresponding one or more of the clients 20. In such an example, the network 30 may, for example, be a peer-to-peer (P2P) network where one of the clients 20 includes an instance of the content manager 44 to enable the corresponding one of the clients 20 to act as a server to other clients 20. In still other embodiments, a computer terminal associated with a network operator (which may be a client 20 or another access terminal) may access the content manager 44 to perform functionality associated therewith.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the content manager 44 configured to operate in accordance with an example embodiment of the present invention. In this regard, for example, the content manager 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which enterprise managers may interact with, configure or otherwise maintain the system 10. In an example embodiment, the enterprise managers may be associated with a distributor of the ovens. As such, for example, the oven distributor may maintain the system 10 for facilitating interaction of all parties related to the operation of the ovens.

As such, the environment of FIG. 1 illustrates an example in which provision of content and information associated with the ovens may be accomplished by a particular entity (namely the content manager 44 residing at the application server 40) that may act as a content distribution platform relative to a plurality of assets (e.g., ovens). However, it should be noted again that the content manager 44 could alternatively handle provision of content and information within a single organization. Thus, in some embodiments, the content manager 44 may be embodied at one or more of the clients 20 and, in such an example, the content manager 44 may be configured to handle provision of content and information associated with ovens that are associated only with the corresponding single organization.

Figure 2:
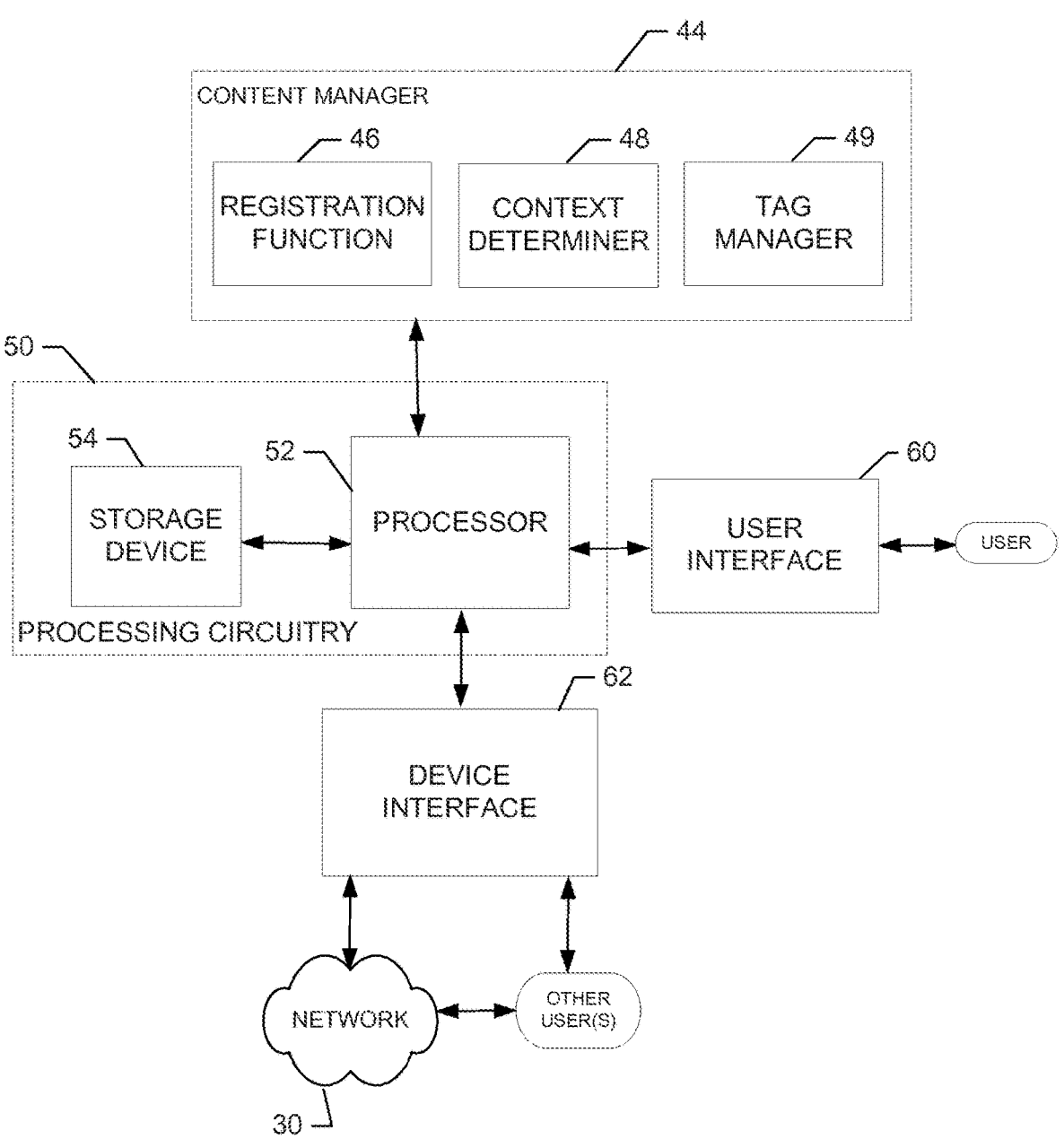
FIG. 2 illustrates a functional block diagram of an apparatus for provision of oven related content or information according to an example embodiment.

An example embodiment of the invention will now be described with reference to FIG. 2. FIG. 2 shows certain elements of an apparatus for provision of food preparation related content or information to an asset such as an oven or one of the other assets mentioned above according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus for provision of food preparation related content or information is provided. The apparatus may be an embodiment of the content manager 44 or a device hosting the content manager 44 to facilitate content distributions. As such, configuration of the apparatus as described herein may transform the apparatus into the content manager 44 so that the content manager 44 may function as a content distribution platform. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the content manager 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the content manager 44 as described below.

The content manager 44 manager may include tools to facilitate the creation and distribution of content via the network 30. In an example embodiment, the content manager 44 may also be configured to manage the provision of access to various parties attempting to employ services provided via the application server 40. Thus, for example, the content manager 44 may be configured to receive queries for information and determine whether the party providing the query has been granted access to receive the information. The content manager 44 may then either fulfill or route requests that are authorized appropriately so they can be fulfilled. The content manager 44 may further be configured to receive data provided thereto and store such data for access by other parties according to the classification of the data, the access restrictions associated with the data, the type of data, or other content management rules that may be defined within the content manager 44. In some embodiments, devices or clients attempting to interface with the content manager 44 may be required to identify themselves with a login and password or other identifying means, which may then be used to determine the access that is appropriate for the corresponding devices or clients. In some cases, certain functionalities executable via the content manager 44 may also only be offered to certain parties, and therefore the content manager 44 may also be enabled to restrict certain performance capabilities of the application server 40 to authorized users. In an example embodiment, parties may subscribe to be members of a service managed by the content manager 44 and restrictions may be applied to service subscribers based on their respective subscriptions.

The content manager 44 may include a registration function 46 that receives electronic information identifying receivers of an asset (e.g., an oven). The registration function 46 may record identifying information of the receiver (e.g., organization name, location, etc.) and identifying information of the asset (e.g., oven model number, software or firmware version information, and/or the like). In cases where multiple assets are associated with the same organization, a listing may be recorded of all of the assets associated with the corresponding organization. The registration function 46 may register the receiver as a community member and distribute community member service descriptions, login information and/or the like to email addresses of the community member. Any applicable access restrictions that apply to the community member may be assigned, and access may be provided thereafter to all accessible content and/or services for which the community member is authorized access via the system 10. Individuals associated with a community member may further register as individuals associated with the community member and may receive access to the corresponding content and/or services that are applicable to the community member with which they are associated. In some embodiments, profile information may be gathered regarding individuals or the community member as a whole. The profile information may, in some cases, be used to determine access levels for the community member or individual, or may be used for determining which services or content to inform the corresponding community member or individual about when a login occurs. Vendors (e.g., food distributors and/or manufacturers) may also be registered as such by the registration function and may receive access to content and/or permission to post content based on access restrictions that may be defined upon registration. In some embodiments, the vendors may also receive exposure to certain information about community members relating to the asset, to identify leads or possible interaction opportunities with specific community members or individuals.

In some embodiments, the registration function 46 may further manage subscription levels and corresponding access restrictions that apply based on the subscription level of a community member or vendor. In cases where subscriptions are applicable, the level of subscription of a community member or vendor may be used to determine the content to which the corresponding community member or vendor has access. The subscription level may also or alternatively determine which content creation tools or services (e.g., enhanced or smart services) to which the community member or vendor will have access. Furthermore, in some cases, the subscription level may determine the type and/or amount of information that a vendor may receive about community members or individuals. Subscription level may also be used in other ways, or no subscription level may be defined at all in some embodiments.

In some embodiments, the content manager 44 may further include a context determiner 48 that may be configured to determine context information associated with a particular asset so that content items (or libraries) that will be presented to the particular asset (or an operator associated with the particular asset) can be tailored to the context of the particular asset or entity with which the particular asset is associated. The context information may include geographic location, equipment registered to a community member (e.g., model, type, version, etc.), operator identity, entity identity, seasonal considerations, preferences (e.g., favored distributors, chefs, product lines, and/or the like), upcoming holidays, weather, fault indications, training schedules, and/or the like. The context determiner 48 may query equipment associated with the community member and/or may reference profile information associated with the community member to determine any applicable context information and provide content item recommendations, libraries or access to content items or libraries based at least in part on the context information determined.

In an example embodiment, the content manager 44 may further include a tag manager 49. The tag manager 49 may be configured to generate tags or other identifiers for association with particular assets. The tags may be used to identify specific associations that are applicable to each corresponding asset on the basis of a characteristic of the corresponding asset. The associations may be related to or indicative of characteristics such as the location of the asset, the organization with which the asset is affiliated, the individual with which the asset is associated, the designated use or function of the asset, model number or type information related to the asset, and/or the like. Thus, for example, the associations may be used to facilitate searching for or otherwise identifying specific assets on the basis of the associations that are applicable to respective ones of the assets (and therefore also based on the characteristics of the assets). As such, in some embodiments, the tags may essentially facilitate filtering of assets on the basis of the associations made with each respective tag and therefore also on the basis of the characteristics of each respective asset. The filtering may be done to isolate specific targets for maintenance, content items, offers, software updates, and/or the like.

In some embodiments, the tag manager 49 may be employed by an operator in order to organize or manage the assets of an enterprise by providing tags to provide an operator defined association for each asset. The operator defined associations, which as indicated above may in some cases be based on location, function, asset type, or organization of the asset, may allow the operator to provide targeted content or services to respective different assets according to organized groupings defined by the operator. In some cases, the operator may be enabled to provide one or more tags to any given asset. Thus, for example, some assets may have multiple operator defined associations so that the corresponding assets will be targetable on the basis of multiple topics or filtering criteria.

In an example embodiment, the tags and the associations that the tags represent may form the basis for explicit or implicit targeted distribution by the content manager 44. In this regard, explicit targeted distribution may be distribution that is explicitly targeted to assets having specific selected tags. For example, if a location based tag is defined for a specific location (e.g., southeast region), then any content or service for which material is to be distributed from the content manager 44 to the southeast region may be distributed by addressing assets having the corresponding tag. Thus, the tag may be used by the operator to define a distribution or address list of assets associated with the tag by explicitly invoking the tag association to access the corresponding addressees. In other words, the operator may select which tags (and therefore corresponding assets) should form the address list for material to be distributed.

Meanwhile, implicit targeting may be accomplished by associating key words or topics with selected tags. Any material to be distributed that includes or is associated with a key word that has an association with a tag may then cause the corresponding assets to be addressed. Thus, for example, an asset (e.g., an oven) that is used for baking may have a tag associated therewith to indicate the function of the asset (i.e., as a baking oven). A recipe for baked goods may be associated with the asset by virtue of the fact that the recipe includes the key word "baked" therein. Rather than having an operator explicitly address all assets having a tag for baked good preparation functionality, the asset may be targeted by implicit association due to matching of the key word "baked" to corresponding assets that have the functionality for baked good preparation.

In an example embodiment, the operator may define key words to associate with certain tags. Thus, for example, even generically named tags could be associated with any number of operator defined key words or phrases. In some embodiments, key word matching may be accomplished using an algorithm that monitors operator activity and makes associations between key words and tags based on frequency of activity, or other operator input. Fixed associations may also be employed in some embodiments. Thus, operator input or activity may not be necessary for some associations between assets and the characteristics of the assets.

Accordingly, in some example embodiments, each tag defines an association between a respective one of the assets and a characteristic of the respective one of the assets to enable the content distribution platform to distribute the content items based on the tags. Thus, the tags may define groups or may be used to associate assets with groups. For example, in some cases, the tag may identify the group or level within a hierarchical organization of groups to which assets are to be associated. All assets sharing the tag may therefore also be associated with the corresponding group or level within the hierarchical organization. Thus, in this example, the tag may actually define the group. However, as an alternative case, the tags may be unique for each asset, but the tags may be associated with existing groups or levels within a hierarchical organization of groups. Accordingly, the groups may exist in a structured manner and the tags may simply be associated with one or more groups. In either case mentioned above, the tag forms the basis for organization of the assets into different groups. However, in the first case, the tags define the groups, but in the second case, the tags are assigned to already defined groups.

The content manager 44 may define a platform via which numerous parties may interact relative to activities associated with a particular oven. In an example embodiment, the oven may be an oven capable of employing more than one energy source in a controlled manner. In this regard, for example, the oven may be enabled to heat food at least partially using radio frequency (RF) energy. In one embodiment, the oven may be configured to generate RF energy at selected levels over a range of 800 MHz to 1 GHz and may include an antenna assembly configured to transmit the RF energy into a cooking chamber of the oven and receive feedback to indicate absorption levels of respective different frequencies in the food product. The absorption levels may then be used, at least in part, to control the generation of RF energy to provide balanced cooking of the food product. Meanwhile, in some cases, airflow that may be provided may be heated to enable browning to be accomplished as well. Other or additional heat sources may also be included.

In an example embodiment, the oven may be controlled, either directly or indirectly, by a cooking controller. The cooking controller may be configured to receive inputs descriptive of the food product and/or cooking conditions in order to provide instructions or controls to the energy sources employed by the oven to control the cooking process. In some embodiments, the cooking controller may be configured to access data tables that define RF cooking parameters used to drive an RF generator to generate RF energy at corresponding levels and/or frequencies for corresponding times determined by the data tables based on initial condition information descriptive of the food product. The cooking controller may further be configured to enable the oven to communicate with other ovens and/or with external devices via wireless or wired connections (e.g., via network 30). Alternatively, the cooking controller may be configured to enable a removable device to be installed to allow data and/or instructions to be uploaded to the oven, and/or allow data to be downloaded from the oven. Cooking signatures, recipes and other data may therefore be communicated to and/or from the ovens in any of these manners.

In the context of the present disclosure, a recipe should be understood to define the cooking materials to be used for preparation of a food product and corresponding instructions to be carried out by an operator or chef relative to preparing the food product. Thus, for example, the recipe may provide a list of ingredients, mixing and/or preparation instructions for the operator or chef, and/or oven settings and cooking times for the operator or chef to follow. Meanwhile, a cooking signature should be understood to relate to specific machine instructions relating to execution of the preparation of the food product for the oven to employ. Thus, the cooking signature may, in some cases, not include any human readable code, but may instead simply include machine executable instructions for operation of the oven relative to preparing a desired food product. Accordingly, the recipe may provide operator or chef instructions that are visible or readable by the operator or chef, and the cooking signature may provide machine instructions for defining cooking parameters or sequences that may be invisible or unreadable by the operator or chef. The recipe and cooking signature may be used together to define a superior prepared food product by enabling the operator or chef to conduct the macro level activities associated with preparing the food product and enabling the oven itself to conduct specifically tailored or defined cooking operations that optimize the results achievable via operation of the oven.

In an example embodiment, the cooking controller may include processing circuitry configured to receive an indication of cooking parameters entered by an operator of the oven where the cooking parameters define at least a food product category of the food product. The cooking controller may then be configured to select a cooking signature corresponding to the food product category. The cooking signature may include information descriptive of inherent properties of the food product category and input response properties defining one or more sets of instructions associated with a cooking sequence for the food product based on the cooking parameters. As such, while a recipe may generally identify ingredients, quantities associated with the ingredients, and basic cooking times and processing techniques, a cooking signature may take into account the inherent properties of the ingredients themselves to enable the dynamic controlling of the hardware (and software in some cases) used to control cooking processes in the oven. As such, a cooking signature may be specifically tied to a corresponding platform (e.g., a specific oven) since the cooking signature may include specific cooking instructions based on the capabilities of the oven relative to expected interactions between the cooking processes of the oven and the specific food products being cooked in the oven. In some cases, a recipe may further include one or more cooking signatures.

The content manager 44 may therefore provide a central repository for content and services related to the ovens including acting as a storage and distribution center for recipes and/or cooking signatures. However, other content and utility may also be provided by the content manager 44 and, as indicated above, the content manager 44 may enable the creation of an ecosystem via which interactions related to the ovens may be fostered. The ecosystem may include a plurality of communication flow paths facilitated by the content manager 44. Moreover, in some embodiments, in connection with providing a SAS environment related to the oven, the content manager 44 may provide a cloud library via which information may be provided for consumption by authorized parties.

Figure 3:
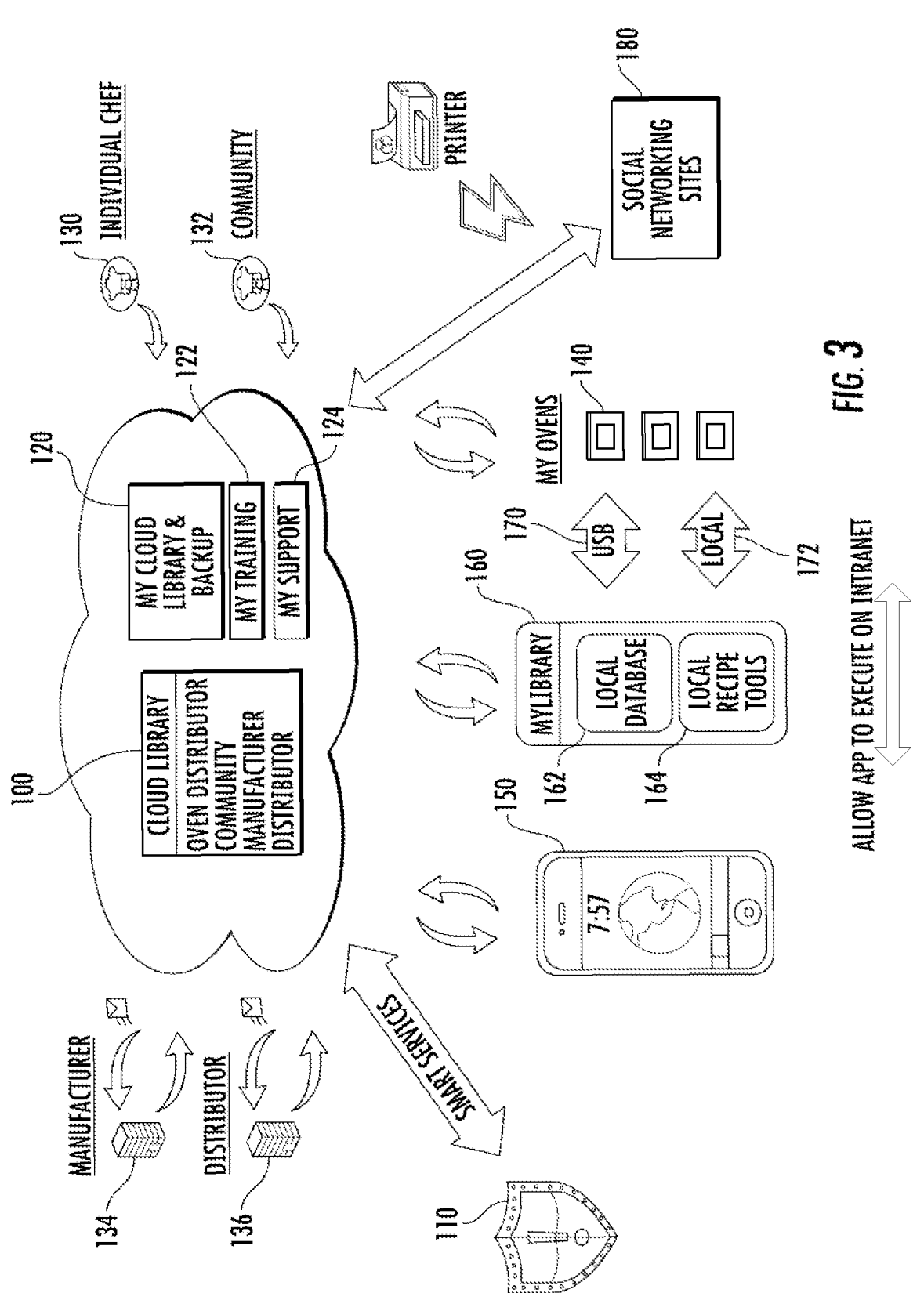
FIG. 3 illustrates a set of communication flow paths that may be enabled by the system of FIG. 1 according to an example embodiment.

FIG. 3 illustrates a set of communication flow paths that may be enabled by the system of FIG. 1 according to an example embodiment. In this regard, FIG. 3 illustrates several of the access mechanisms that may be employed to provide content to the content manager 44 or receive distributed content from the content manager 44. Moreover, FIG. 3 also illustrates an example of how some content may be organized for access and/or use according to one exemplary embodiment.

The content manager 44 may be provided within a SAS context. As such, the content manager 44 may essentially reside in "the cloud", as shown in FIG. 3. Communications between the content manager 44 and other entities may, in some cases, be protected by a firewall. In some examples, the content manager 44 may define public and private cloud sections. In this regard, a public section may be exemplified by a cloud library 100 that may be accessible to all community members (e.g., the oven distributor and enterprise manager, customers, food manufacturers, food distributors, and/or the like). The cloud library 100 may therefore include recipes and/or cooking signatures that are provided for general consumption to all users of the ovens.

In some cases, the cloud library 100 may further include content related to various smart services 110 such as troubleshooting or diagnostic services. As such, for example, operational data may be uploaded to the cloud library 100 by a community member for analysis, community member may navigate troubleshooting flowcharts, or online chat may be conducted with technicians to diagnose and resolve technical issues. Access to smart services 110 may enable remote configuration of the ovens, the provision of software or firmware updates, and/or the provision of services based on usage or operational data. Usage data (e.g., products being cooked in the ovens and methods used to cook such products) may be used to identify related products, recipes, cooking signatures or improvements to products, recipes or cooking signatures. Operational data may be used to provide predictive failure analysis to suggest preventive maintenance or measures and/or provide content or service related to such measures. Remote troubleshooting and/or servicing may also be employed in connection with smart services 110 by engaging offsite personnel with knowledge of the specific equipment located onsite. Oven status updates may also be provided in connection with smart services 110. Accordingly, smart services 110 may be provided and/or supported to greatly expand the ability of community members to perform and receive assistance relative to performance of asset management.

Remote configuration of ovens (or other assets) may be accomplished on an individual or group basis. Moreover, a particular organization that is a community member (e.g., a restaurant chain) may define configurations for all or a portion of its ovens so that the ovens can be configured remotely in a consistent manner. The configurations may be accomplished on an individual basis during startup of a new oven (e.g., so that the new oven has the same configuration as other deployed ovens). Alternatively or additionally, the configurations may be accomplished on an organization-wide basis as a part of an upgrade or maintenance related activity. Preferences and other settings may therefore be provided with some form of consistent default across the organization. However, in some cases, chefs may be enabled to define particular preferences or settings (some of which may be shared or published for comment as is also described herein) to tailor the ovens, or their own profiles, to their specific needs or desires.

In some embodiments, the content manager 44 may be enabled to also define private cloud sections so that individual community members may have their own respective libraries or cloud sections (e.g., My Cloud Library 120, My Training 122 and My Support 124). Private cloud sections may be used by a particular organization (i.e., a community member) to provide contents such as recipes and/or cooking signatures (e.g., in My Cloud Library 120) that are specific to the organization. Access to private cloud sections may be limited to the organization and those invited by the organization. In some embodiments, one or more of the private cloud sections may even exclude the system administrator or enterprise manager from access.

Other sections (e.g., My Training 122 and My Support 124) may include content that is specific to the hardware and/or software modules employed by the particular organization and may be interactive or otherwise cooperatively maintained with the enterprise manager or system administrator. For example, when new ovens are purchased by a community member, the community member's private training and support sections may be updated to include training materials and support related materials that are specific to the new oven models. The materials may include, for example, training videos, equipment manuals or other training material that is specifically associated with the actual equipment that the community member has registered or purchased. As such, community members do not need to navigate through a plurality of training or service manuals to find those that apply to the equipment employed by the particular organization with which they are affiliated. Instead, the training and support manuals that are applicable to the equipment employed by the particular organization will be known to the system and provided to community members seeking training or support. In other words, the content manager 44 may provide global access to all community members for some content, while private sections specific to some (e.g., based on subscription level) or all members be provided for more personalized content and/or services. Online chatting with service personnel and other owner relations services may also be provided in connection with smart services 110 or in connection with specific cloud sections tailored to the provision of corresponding specific services.

As shown in FIG. 3, parties that may interact with the system may include individual chefs 130, community members 132 (e.g., customers or purchasers of ovens) on an entity wide basis, manufacturers 134 (e.g., makers of food products that can be cooked in the ovens), and distributors 136 (e.g., companies that distribute the food products produced by the manufacturers). These parties may have reading capabilities for content in the public portions of the cloud (e.g., the cloud library 100) and for content provided by entities that have given them access. These parties may also themselves generate and publish content to the public portions of the cloud and to any entities that have given them access.

In some embodiments, ovens 140 themselves may be enabled to interact with the content manager 44. However, in other embodiments, the ovens 140 may interact with mobile client devices 150 or fixed client devices 160 via any of various communication methods (e.g., USB 170, local network communications 172, Internet, intranet, LAN, etc.). Moreover, the fixed client devices 160 may include local databases 162 and/or local recipe generation tools 164. Content may be selectively uploaded/downloaded or exchanged between the cloud library 100, My Cloud Library 120, and the local databases 162. In some embodiments, an application may be provided that may be run on a smart phone or other mobile communication device (e.g., mobile client device 150) so that the local databases 162 and/or local recipe generation tools 164 may be accessed, or content in the cloud may be accessed. Content may be printed, posted, shared, downloaded, uploaded, or otherwise exchanged via the content manager 44 according to any applicable restrictions defined for the corresponding content or community member.

Using the tools provided via the example systems shown in FIGS. 1 and 3, various libraries of recipes and products may be provided. Publicly available libraries may be placed in the cloud library 100. However, private libraries may be placed in My Cloud Library 120 or other restricted access locations. In some cases, manufacturers and distributors may provide their own respective libraries (e.g., vendor libraries) that include recipes (and in some cases also corresponding cooking signatures) that include products from the respective food manufacturers or distributors. In some cases, the recipes may include private label distributor items. The vendor libraries may be publicly available in some embodiments. However, in other cases, the vendor libraries may be provided to private cloud sections of specific customers of respective vendors.

In an example embodiment, the oven distributor or enterprise manager may also create recipes (and/or cooking signatures) for public distribution via a community library. The community library may also host content from featured chefs, sponsors, or other parties that may be engaged by the enterprise manager. Other community members (e.g., oven users) or individual chefs that desire wide dissemination of their content may also publish content to the community library in some embodiments. In some cases, the community library may be synonymous with the cloud library 100 and may be fully public. However, in other embodiments, the cloud library 100 may include some exclusive portions that have subscription based or other access limitations. For example, oven purchasers may automatically receive a basic subscription that provides access to public forums and enables the purchaser to set up certain private libraries and functions tailored to the specific equipment purchased. Meanwhile, higher level subscription purchasers may be entitled to access to restricted access libraries. The restricted access libraries may be associated with featured chefs, sponsored products, enhanced services, and/or the like.

Private libraries may be maintained on an organizational or even individual level. In some cases, any organization may be enabled to set up private libraries for the storage of content (e.g., recipes and/or cooking signatures) that is either generated by or within the corresponding organization. The private libraries may also store content acquired from the vendor libraries or the community library for easy access. Organizations may also allow (or their accounts may be setup accordingly to allow) individuals within the organization (e.g., chefs, managers and/or the like) to store content in their own individual private libraries. Privacy levels may be established as desired by the organization. For example, the organization may enable selected individuals or selected other community members to have access to the organization's private libraries. Alternatively or additionally, the organization may restrict access to just people associated with the organization (including excluding access to the enterprise manager). Accordingly, a community member that uses the system 10 to distribute and/or standardize recipes, cooking signatures, procedures, etc., may be enabled to confidentially distribute such information. Meanwhile, a community member that seeks to actively promote their products and/or brands may open access (or target access) to potential customers or consumers. In some embodiments, signing into the system 10 (e.g., with a login and password) may automatically provide for access to the public library and any private libraries to which the logged in user is admitted. Alternatively, some private libraries may require separate secure logins.

In some embodiments, content within certain libraries or specifically identified content within any particular library may be submitted for public comment. For example, recipes or cooking signatures may be submitted in a public forum for comment or review. Reviewers may submit comments, make recommendations for modifications, submit questions, provide ratings, or request product and/or product information associated with content posted for review. In some embodiments, preformatted feedback or order forms may be generated responsive to selection of an option to provide feedback or comment with respect to content posted in a public library. The preformatted forms may then be submitted to provide feedback or solicit information or products. In other embodiments, existing social network platforms 180 may be integrated (e.g., Facebook, Twitter, LinkedIn, etc.) into the system 10. As such, although the system 10 itself may be set up in a manner that is similar to a social network, in some cases the system 10 may also interact with other social networks to enable integration with the message posting, status updating, and/or professional engagement that is facilitated by other social networks.

In an example embodiment, some of the content that may be posted in the libraries (e.g., in the vendor library) may be associated with particular manufacturers or distributors and may be associated with specific brand name products. Meanwhile, content generated by the oven distributor or enterprise manager, and content generated by community members or other individuals may not be associated with specific brand name products. Thus, in some cases, recipes or other products may be different depending upon the source of the content. In an example embodiment, products or recipes that are associated with a particular manufacturer or distributor may include an identifier (e.g., logo, brand symbol, and/or the like) of the corresponding entity along with a title of the product/recipe and a description provided by the entity. Recipes may include cooking signatures for use in the oven around which the system is setup in some cases as well. In some cases, the product or recipe may also include a photo and/or pitch materials, or even a distributor call to action. Other community member generated products or recipes may include a product title and description along with a photo and full recipe. If applicable, a cooking signature may also be included. Authorship information may be included to identify the source of the product or recipe/signature. Printing functionality may also be provided to enable readers to print desired recipes. Accordingly, in some cases, each content item (e.g., recipe and/or signature) that is available for provision to an asset (e.g., oven) may include both visible and invisible content. The visible content may include the recipe, information about the originator of the recipe, information about specific products or suppliers associated with the recipe, information about assets/ovens for which signatures may be provided, and/or the like. Meanwhile, the invisible content may include the cooking signature or signatures associated with the recipe and/or any assets that may be employable in connection with preparing the recipe. The visible content may therefore be useable by the operator to identify and select recipes or other content, and the invisible content may be invisible to operators, but may be used by the asset to execute functionality associated with the visible content.

Figure 4:
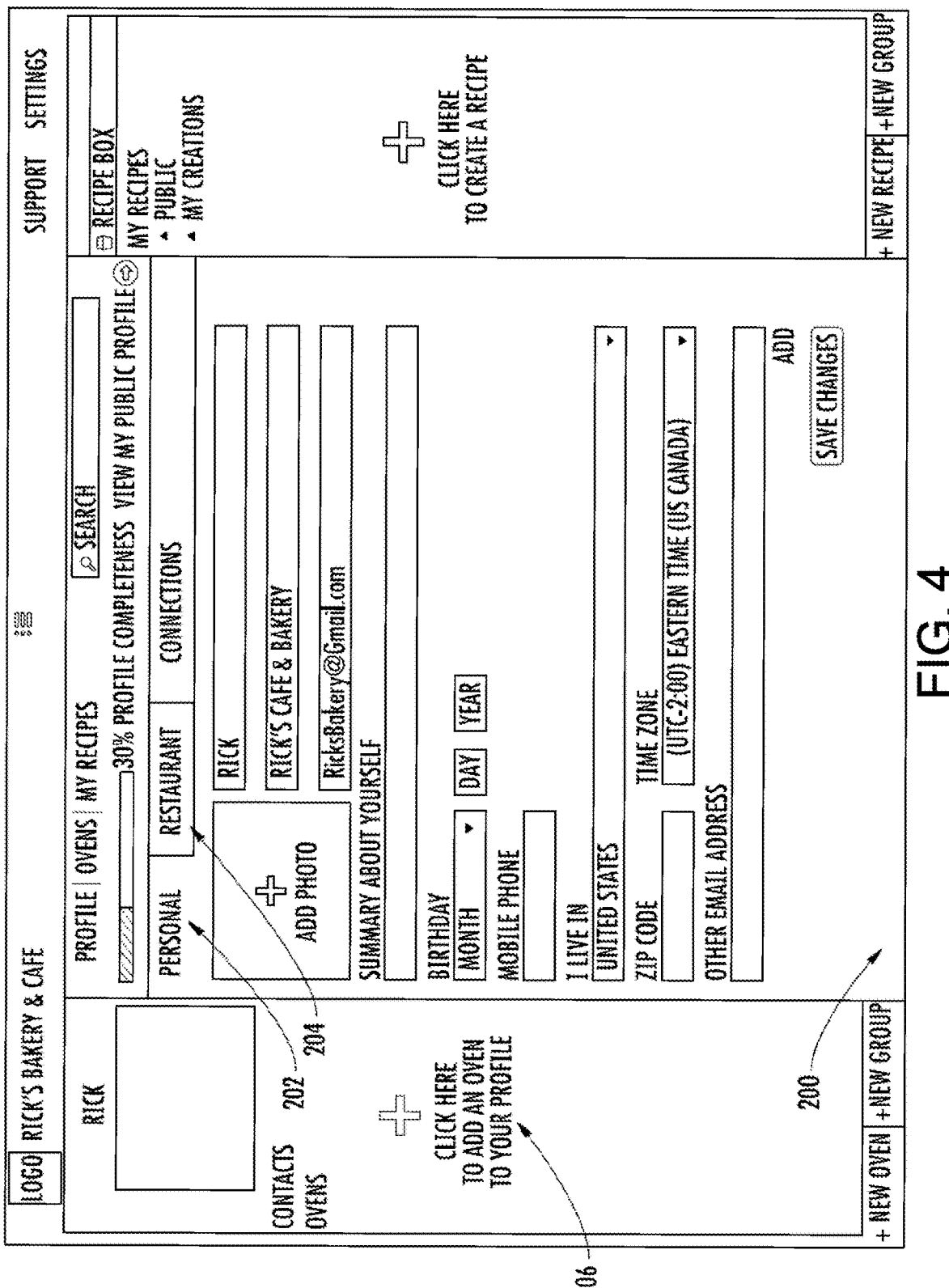
FIG. 4 illustrates an individual profile page according to an example embodiment.

FIGS. 4-8 illustrate a series of control console interface displays that may be generated to facilitate the employment of tags as defined herein. In some embodiments, an operator may initially define an operator and/or entity profile to facilitate interaction with assets according to an example embodiment. In some embodiments, the displays provided in FIGS. 4-8 may be provided at a client device (e.g., client 20) associated with one or more assets or at one of the assets itself. FIG. 4 illustrates an individual profile page 200 according to an example embodiment. As can be seen in FIG. 4, profile creation may be accomplished for an individual (e.g., a chef, manager, employee and/or the like) or an entity (e.g., a restaurant, distributor, enterprise, and/or the like). In some embodiments, profile generation may be accomplished via selection of a personal tab 202 for generation of a profile of an individual or a restaurant tab 204 for generation of a profile for an entity. Details associated with generation of a personal profile in accordance with one example are shown in FIG. 4 and may include things such as a name, organizational affiliation, email address, physical address, birthday, phone number, an image, and/or the like. In an example embodiment, an asset addition option 206 may also be provided to associate assets with the individual or to allow the individual to register assets.

Figure 5:
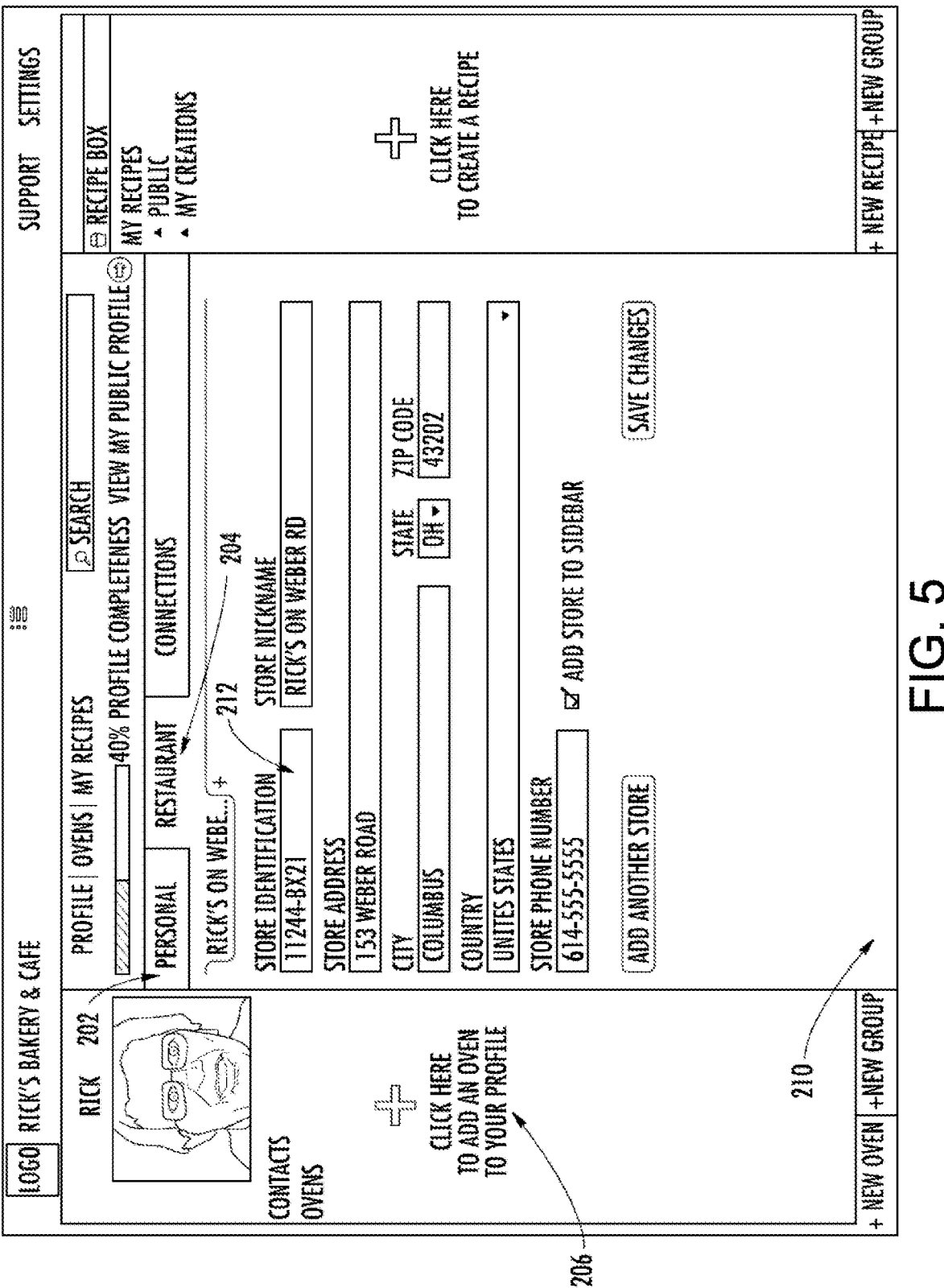
FIG. 5 illustrates an entity profile page according to an example embodiment.

FIG. 5 illustrates an entity profile page 210 according to an example embodiment. As shown in FIG. 5, details associated with generation of an entity profile may include the name, address, phone number and/or the like for the entity. In some cases, the profile may also define a store identifier 212 and/or a store nickname. Like the individual profile page of FIG. 4, the entity profile page 210 may also include the asset addition option 206 via which assets may be associated with the entity, or via which the entity may register assets.

Figure 6:
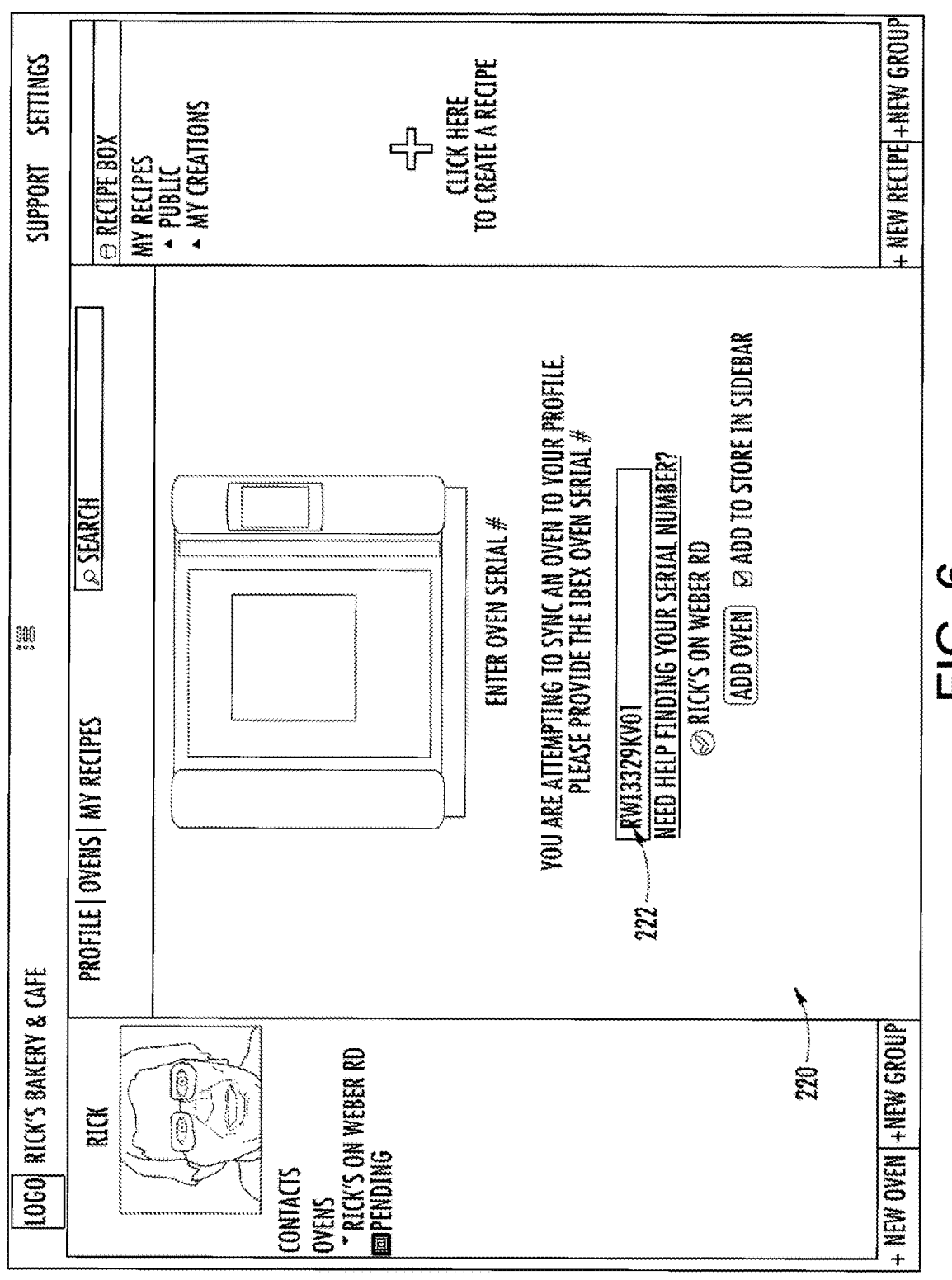
FIG. 6 illustrates an example initial registration screen according to an example embodiment.

By selecting the asset addition options 206, information about assets may be entered so that the corresponding assets are registered (e.g., via the registration function 46). FIG. 6 illustrates an example initial registration screen 220. As shown in FIG. 6, an example asset such as an oven may be registered by providing the serial number of the oven in a serial number entry field 222. In some embodiments, the capabilities and/or specifications of each type or model of oven may be determinable or known based on the serial numbers entered in the serial number entry field 222.

Figure 7:
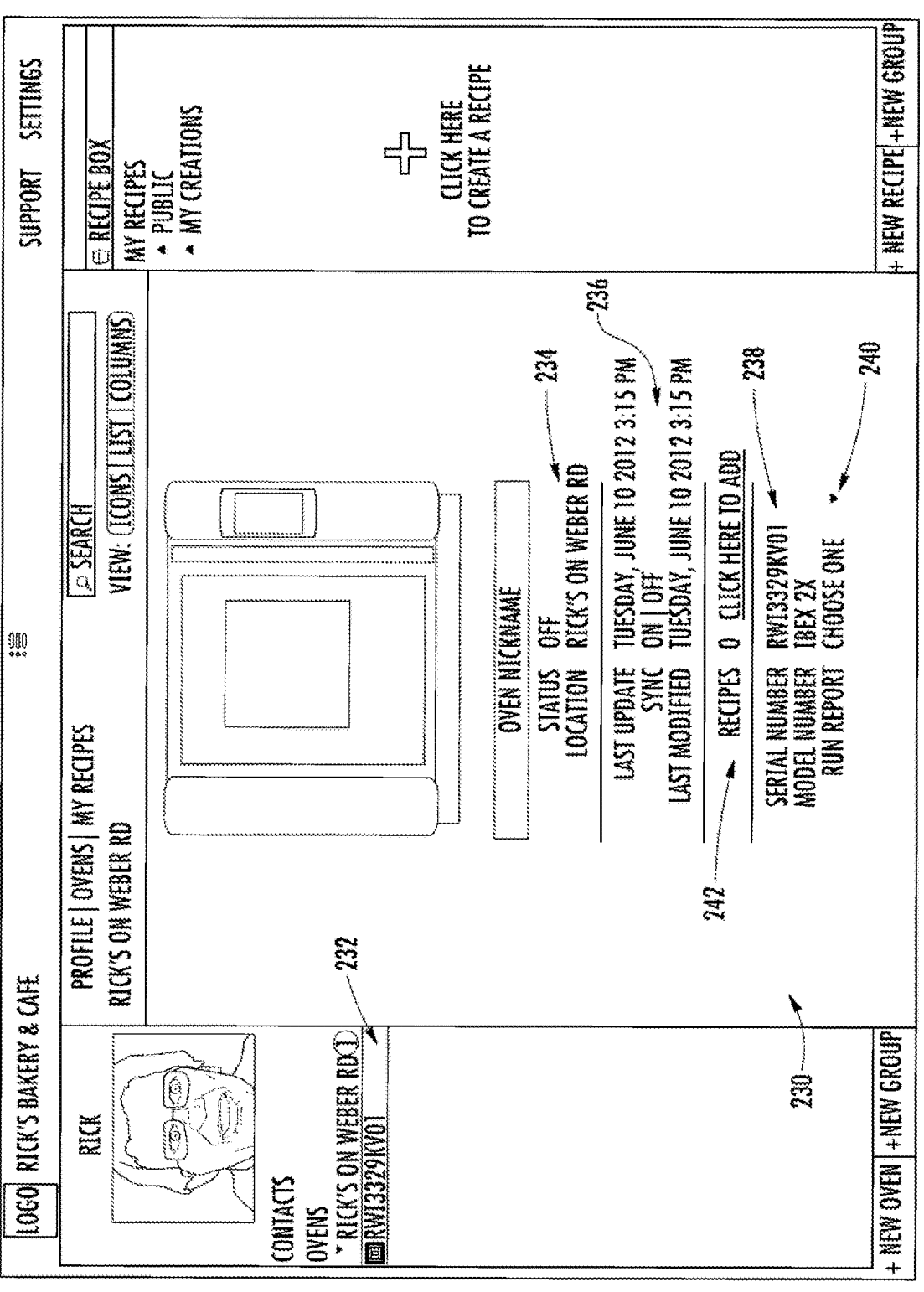
FIG. 7 illustrates an example of an asset information page according to an example embodiment.

FIG. 7 illustrates an example of an asset information page 230 according to an example embodiment. For each registered asset, the asset information page 230 may be accessible via an asset list 232 that may be associated with the individual or entity. The asset information page 230 may include status information 234 that may indicate the current status of the asset and/or the asset's location. The asset information page 230 may also include update information 236, which may indicate the last time the asset received an update or was otherwise modified. In some cases, the update information 236 may also indicate whether the asset is configured for synchronization with a network updating service. Accordingly, the asset may sync with the service periodically in order to receive updates. Updates may otherwise or additionally be provided in response to specific stimuli and/or in response to targeted delivery on the basis of tagging as described herein. As shown in FIG. 7, the asset information page 230 may also include asset information 238 and a report generation tool 240 the ability to select one or more reports regarding asset operation. In some embodiments, the asset information page 230 may also indicate the number of content items 242 (e.g., recipes) downloaded to the asset.

Figure 8:
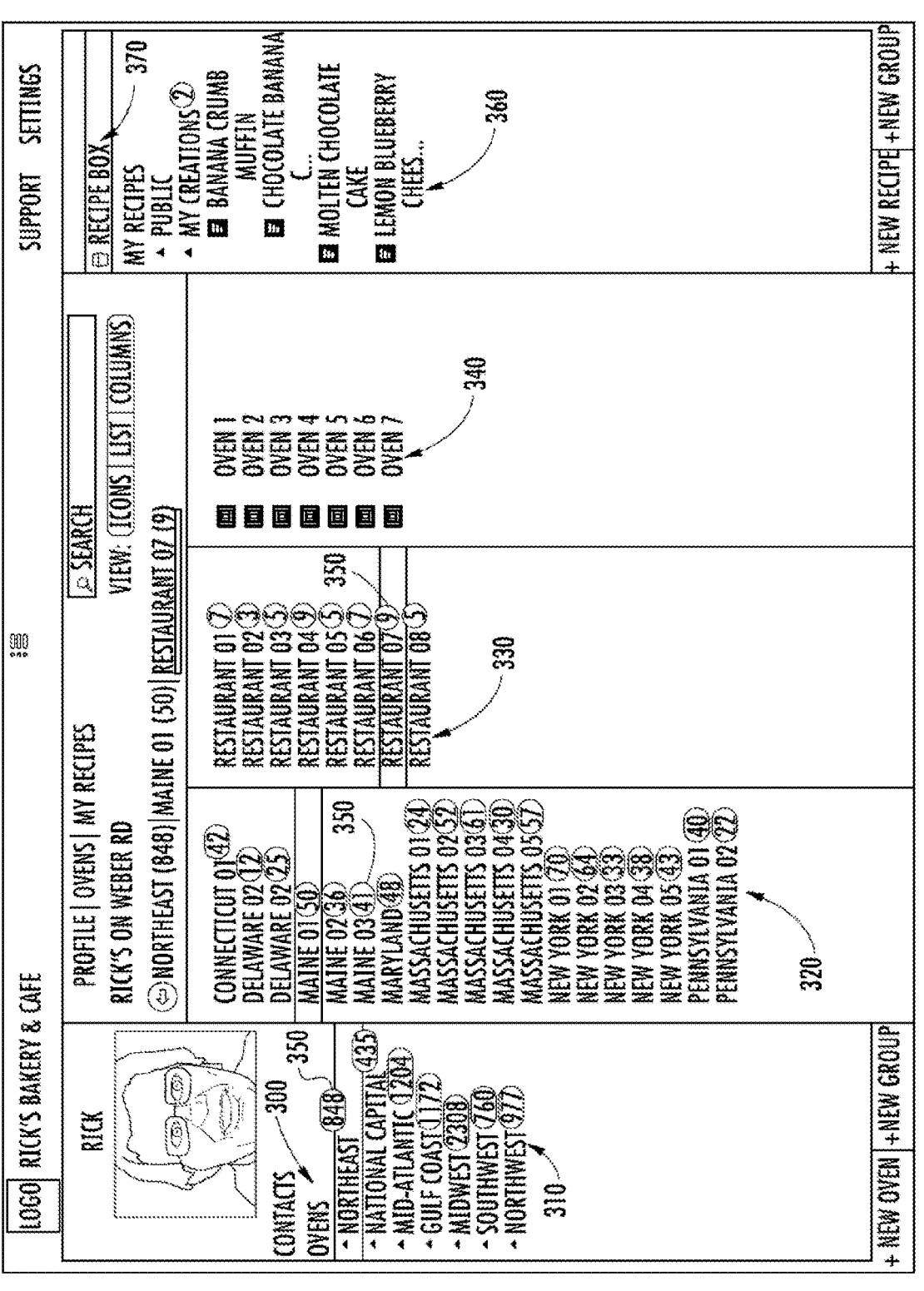
FIG. 8 illustrates a listing of location based organizational criteria for a particular enterprise according to an example embodiment.

In the process of creating profiles for individuals and/or assets, the information gathered for profiling may define characteristics that are extracted by the tag manager 49 to form tags as described above. For example, the serial number of the oven may be associated with a model number or other type related information to form the basis of a tag. The location of the oven may also form the basis for a tag. In some cases, the locations may further be organized by region, and in some cases, levels of regional organization. Each level of organization may form a unique tag so that each asset is associated with a number of location based tags defining a location of the asset over a number of levels from generic to very specific. FIG. 8 illustrates a listing of location based organizational criteria (e.g., as defined by location tags) for a particular enterprise according to an example embodiment. As shown in FIG. 8, the asset list 300 includes regional divisions 310. If the northeast region is selected, various sub-regions are provided in a sub-regional asset list 320. Particular restaurants in the region may be listed in a restaurant listing 330, and the assets (e.g., ovens) associated with the corresponding restaurant are further provided in an asset listing 340. Thus, FIG. 8 shows a series of different tag levels within a hierarchical structure of organizing assets on the basis of location related characteristics. The same type of hierarchical organization can also be accomplished relative to any other desirable characteristic such as functions, asset type (or capabilities), organization, and/or the like. In the example of FIG. 8, each tag grouping may include a descriptor 350 associated therewith. The descriptor 350 may indicate the number of assets or content items that are associated with the corresponding tag. Thus, for example, the descriptor 350 of each higher level may include a sum of all descriptors of lower levels that fit within the corresponding category.

Figure 9:
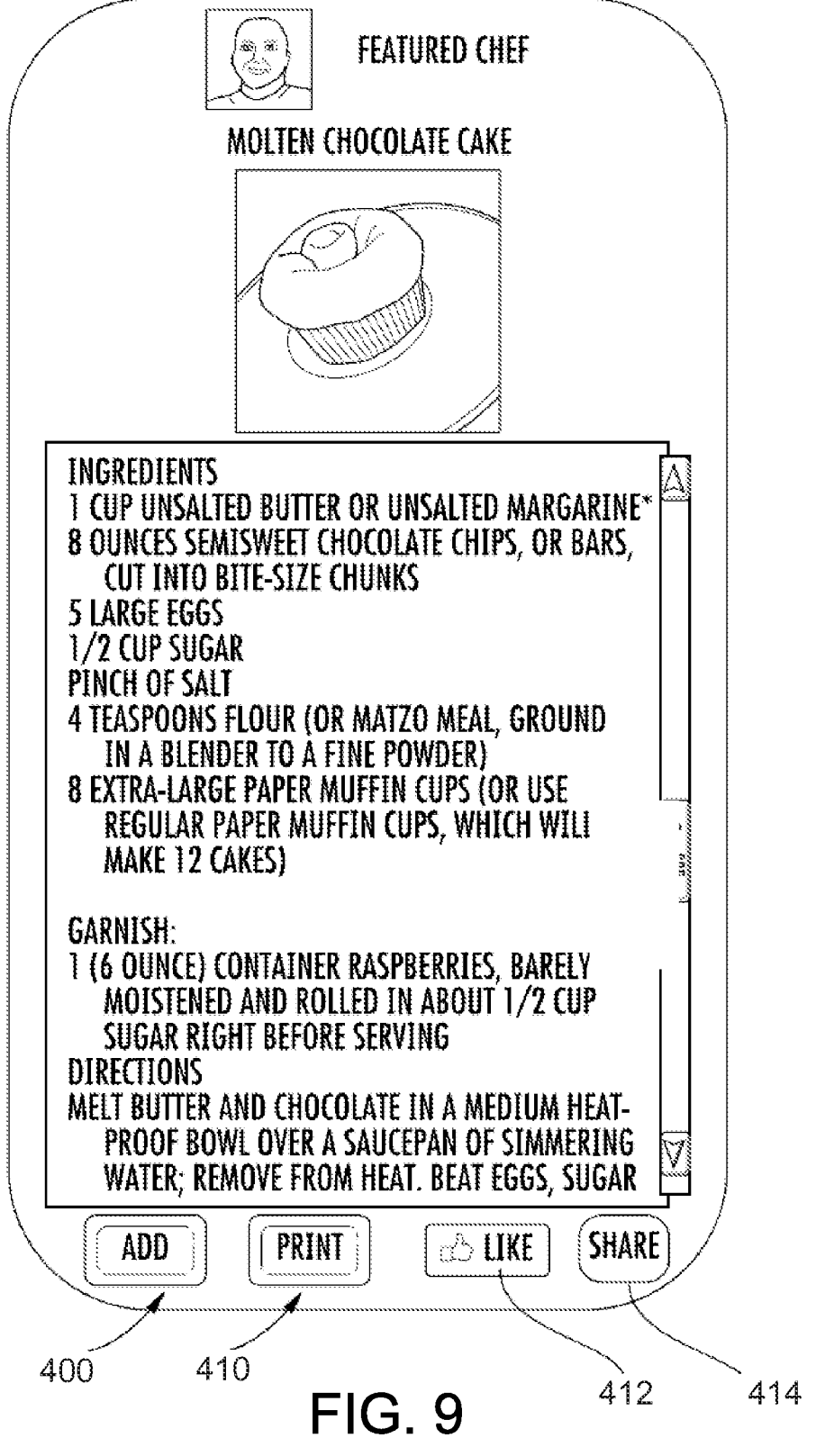
FIG. 9 illustrates an example of a recipe that may be provided by a featured chef or other community member according to an example embodiment.

In some embodiments, a particular recipe or other content item may be selected to be provided to one or more ovens. FIG. 9 illustrates an example of a recipe that may be provided by a featured chef or other community member. As shown in FIG. 9, a selection option 400 may be provided to enable the viewer to add the recipe to a personal or company library. Alternatively or additionally, the operator may send the recipe to a single oven or group of ovens selectable via the asset list 300 of FIG. 8. In this regard, an entire group of ovens (on the basis of selecting one tag) may be selected for provision of the recipe, or individual ovens may be selected. In some embodiments, a recipe 360 may be dragged from a recipe box 370 and dropped on any one of the assets or asset levels to download the corresponding recipe to the respective asset or assets associated with the respective tag.

Figure 10:
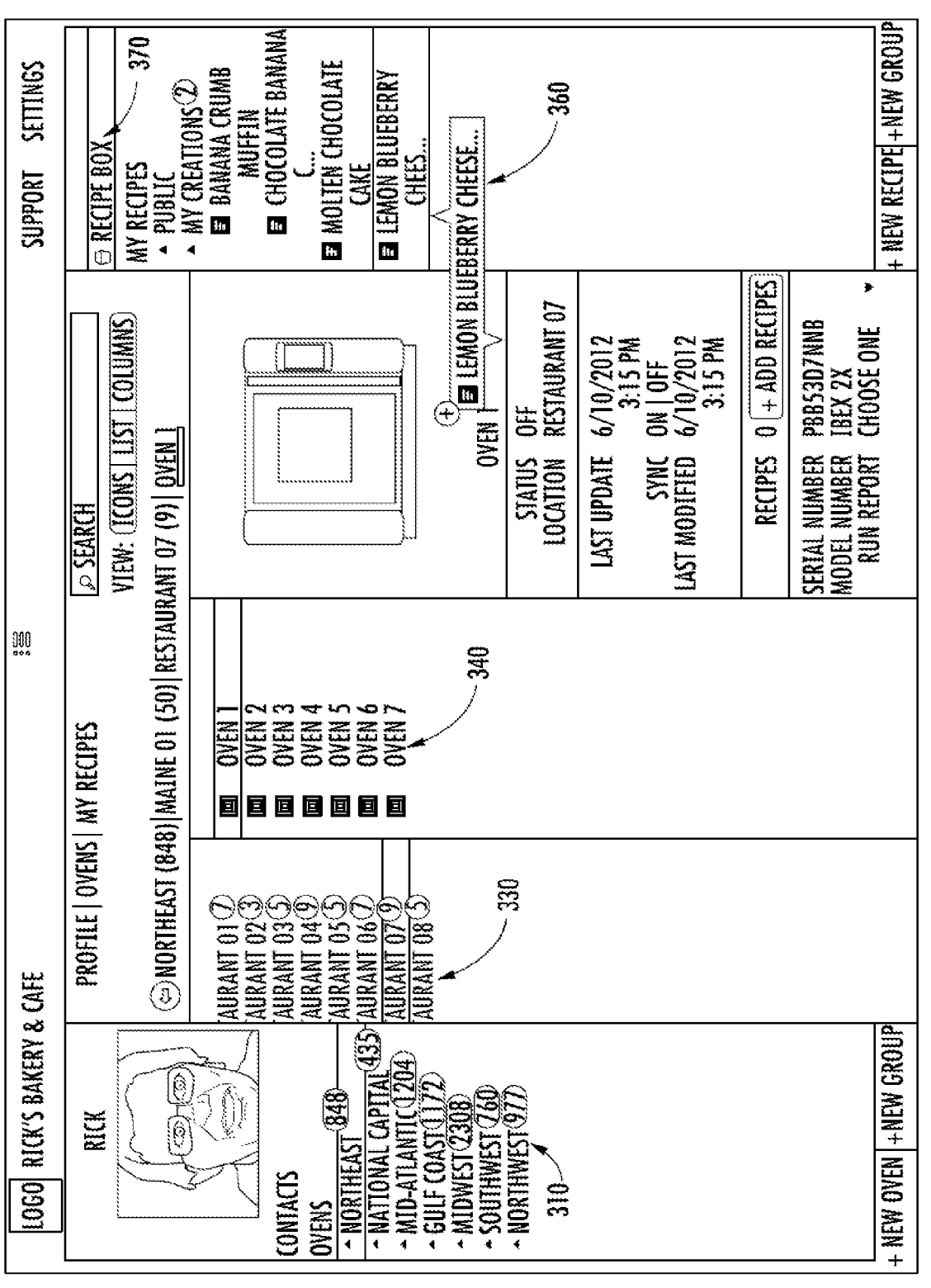
FIG. 10 illustrates a recipe being transferred to a particular asset in accordance with an example embodiment.

FIG. 10 illustrates the recipe 360 being transferred to Oven 1 in accordance with this example. However, it should be appreciated that the recipe 360 could alternatively be dragged to any other tag level to transfer the recipe to all assets associated with the corresponding tag level. In an example embodiment, a particular recipe may also include a print option 410 may be provided to print the recipe. A rating option 412 may also be provided in some cases. Some embodiments may also or alternatively include a share option 414, which may be selected to post information associated with the recipe to a social networking site. In some embodiments, recipes that are selected to be shared to a social networking site may be recommended or provided to ovens on the basis of implicit tags (e.g., for key word associations as described above.

Figure 11:
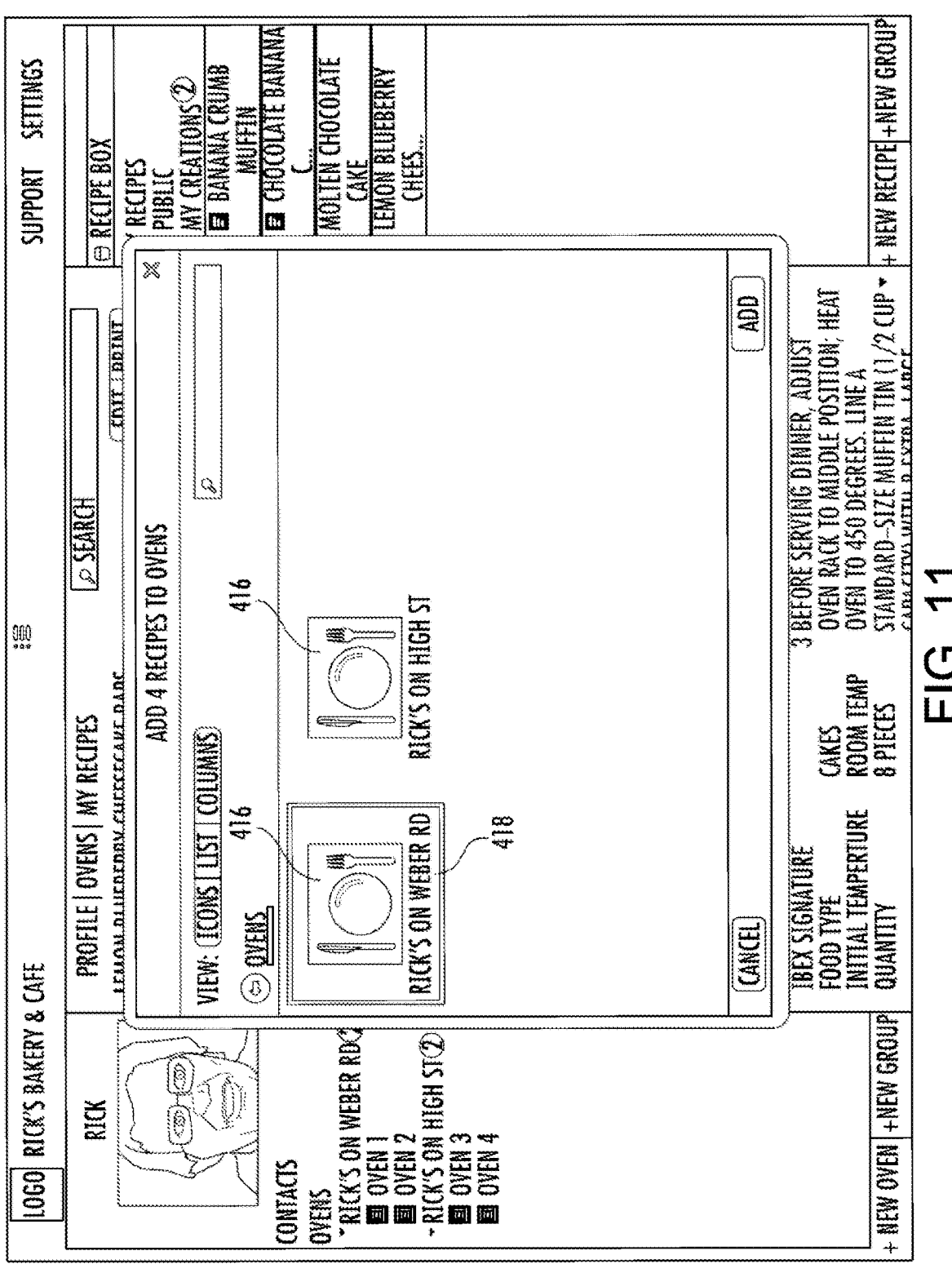
FIG. 11 illustrates an example of a hierarchical organization of assets on an organizational basis

As indicated above, assets could be organized (and tagged) on other bases as well. For example, the assets could be organized by function, organization or type, with corresponding tags. FIG. 11 illustrates an example of a hierarchical organization of assets on an organizational basis. In this regard, the icons 416 may each represent different organizations within an enterprise. Selection of either icon may allow the operator to view assets within each organization (e.g., separate restaurants), or at least a next level of organization of the assets of each restaurant. Thus, the hierarchical organization need not necessarily be homogeneous. In other words, one level could be location based, and a subsequent level could be function based, or type based. Highlighting 418 of one or both of the icons 416 may be used to select all assets in the group for receipt of content.

Figure 12:
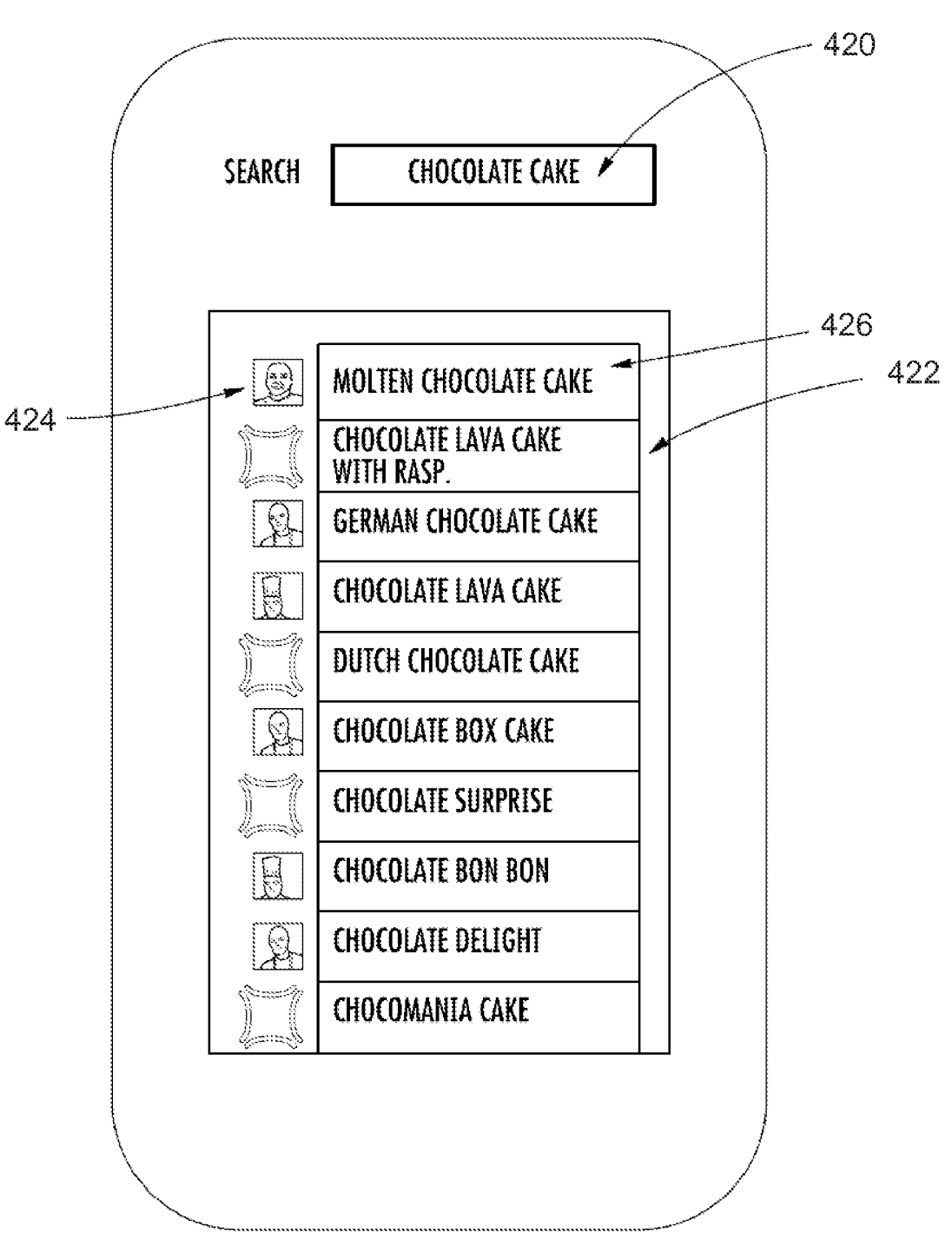
FIG. 12 illustrates a search page for use in connection with a public library according to an example embodiment.

Thus, in an example embodiment, the content manager 44 may further enable community members to conduct searching operations for specific assets or groups of assets to target for provision of content. In some embodiments, the tag manager 49 may also be used to tag content items. The tagging of content items may assist in enabling the provision of content of interest to specific assets on the basis of matching of tags. For example, community members may search a given library for recipes of interest by entering a search term. Content items associated with the search term may then be revealed. In some cases, a further listing of assets that may be candidate assets for delivery of the content items on the basis of tag matching may also be provided. Otherwise, the operator may search assets using the same key word to identify related assets. FIG. 12 illustrates an example search page for use in connection with a community library. As shown in FIG. 9, the search query may be provided in a search field 420. The search may be for a particular recipe, cooking signature, manufacturer, distributor, content item, chef, and/or the like. A list of search results 422 may then be provided. In some cases, an identity of the author of each listing may be provided via an icon, image or graphic 424 along with a short title 426 of the corresponding content item. If one of the content items is selected (e.g., at one of the clients 20), a corresponding recipe may be retrieved (e.g., by the content manager 44 at the application server 40) and presented to the user (at the client 20).

In some embodiments, the content manager 44 may host discussion forums, or provide a platform for sharing cooking demonstration videos as streamed or downloadable content in addition to recipes, products and/or cooking signatures. Community members may post status information, questions, or other discussion to public or private message boards, and other community members may exchange information or discussion points with each other via the message boards. As such, the content manager 44 may provide a platform for the receipt of content from community members (e.g., oven owners), from the enterprise manager (e.g., the oven distributor), and from other organizations that provide services or products related to the oven (e.g., service companies, food distributors, food manufacturers, and/or the like). The content manager 44 may provide tools for the storage or posting of content at any of various libraries or other forums, and may further provide tools for accessing the content, which may in some cases include access restrictions.

Figure 13:
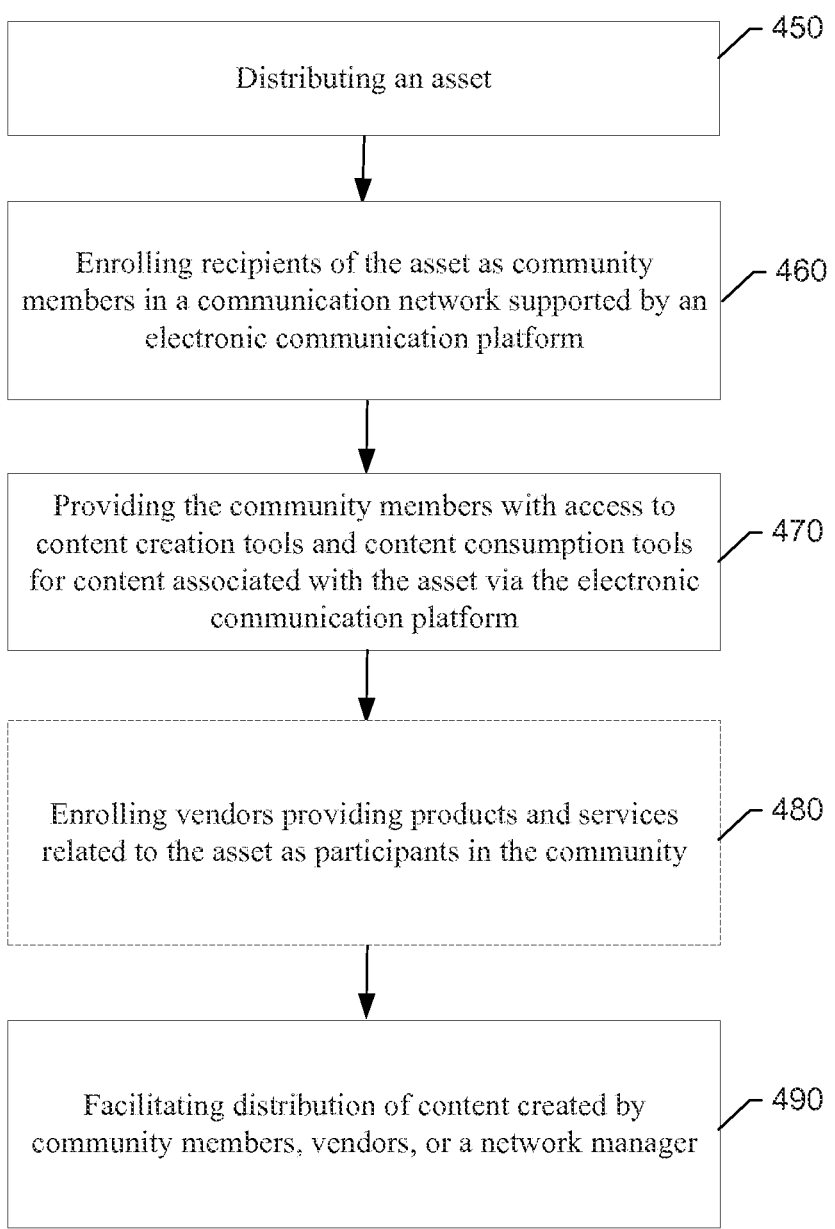
FIG. 13 illustrates a block diagram of a method that may be supported by the system of FIG. 1 according to an example embodiment.

As such, the system of FIG. 1 may provide a mechanism via which a number of useful methods may be practiced. FIG. 13 illustrates a block diagram of one method that may be associated with the system 10 of FIG. 1. As shown in FIG. 13 the method may include distributing (e.g., via sale, lease, grant, etc.) an asset (e.g., an oven) at operation 450. The method may further include enrolling recipients of the asset as community members in a communication network supported by an electronic communication platform (e.g., the system 10 and specifically, the content manager 44) at operation 460. At operation 470, the method may further include providing the community members with access to content creation tools and content consumption tools for content associated with the asset via the electronic communication platform. Although not required, the method may further include enrolling vendors providing products and services related to the asset as participants in the community at operation 480. In some embodiments, the method may further include facilitating distribution of content created by community members, vendors, or a network manager at operation 490.

From a technical perspective, the content manager 44 described above may be used to support some or all of the operations described in FIG. 13. As such, the platform described in FIGS. 1-3 may be used to facilitate the implementation of several computer program and/or network communication based interactions. As an example, FIGS. 14 and 15 are flowcharts of a method and program product according to an example embodiment of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., oven 10, client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, a method according to one embodiment of the invention, as shown in FIG. 14, may include receiving information indicative of a recipient of an asset (e.g., an oven) at operation 500. The information may be electronic data indicating an identity of the asset and an organization associated with the asset. The method may further include registering the recipient in association with the corresponding asset to establish the recipient as a community member at operation 510. The method may further include providing the community member with access to a communication network for sharing content (e.g., content items including visible and invisible content as described above) related to the asset at operation 520. In some embodiments, the method may further include providing the community members with access to content creation tools and content consumption tools for content associated with the asset via the communication network at operation 530. Although not required, the method may further include providing access to smart services associated with the asset identified in association with registration of the community member at operation 540. Also not required, the method may include receiving electronic data indicating and identity of a vendor providing products or services related to the asset at operation 550 and in some cases registering the vendor as a participant in the communication network. In some embodiments, the method may further include facilitating distribution of content created by community members, vendors, or a network manager at operation 560. The method may further include facilitating the provision of information (e.g., leads, orders, etc.) to vendors regarding community member activity relating to the asset at operation 570. In some embodiments, facilitation as described herein may include the application of algorithms for determining which content to present to corresponding community members and/or the application of algorithms for organizing the content received according to access rules and/or the generation of preformatted messages to be used to provide communication between or regarding community members and vendors.

In another example embodiment a method of tagging assets to enable targeted content or service delivery may be provided. FIG. 15 illustrates an example of such a method. The method may include receiving identifying information regarding a food preparation asset at operation 580, registering the asset in association with at least one profile at operation 582 and enabling one or more tags to be associated with the asset where each tag defines an association between the asset and a characteristic of the asset at operation 584. The method may further include storing the association between the one or more tags and the asset along with other tags associated with other assets at operation 586, and enabling an operator to identify one or more selected assets to target for delivery of content via a network based on selection of a tag at operation 588.

In some cases, at least one of the one or more tags may be associated with information extracted from the at least one profile. In an example embodiment, enabling the operator to identify one or more selected assets to target comprises providing a display of tags in a hierarchical organization based on location, function, asset type, or organization and enabling the operator to select a tag from the hierarchical organization. In an example embodiment, the method may further include displaying a descriptor for at least one tag where the descriptor indicates a number of assets or content items that are associated with the at least one tag. In some cases, enabling the operator to identify one or more selected assets to target may include enabling the operator to cause content distribution to a selected asset by dragging a content item the selected asset from the hierarchical organization to a tag associated with the selected asset In an example embodiment, an apparatus for performing the method of FIGS. 14 and 15 above may comprise a processor (e.g., the processor 52) configured to perform some or each of the operations (500-588) described above. The processor may, for example, be configured to perform the operations (500-588) by performing hardware implemented logical functions, executing stored instructions, or executing algorithms for performing each of the operations.

Figure 16:
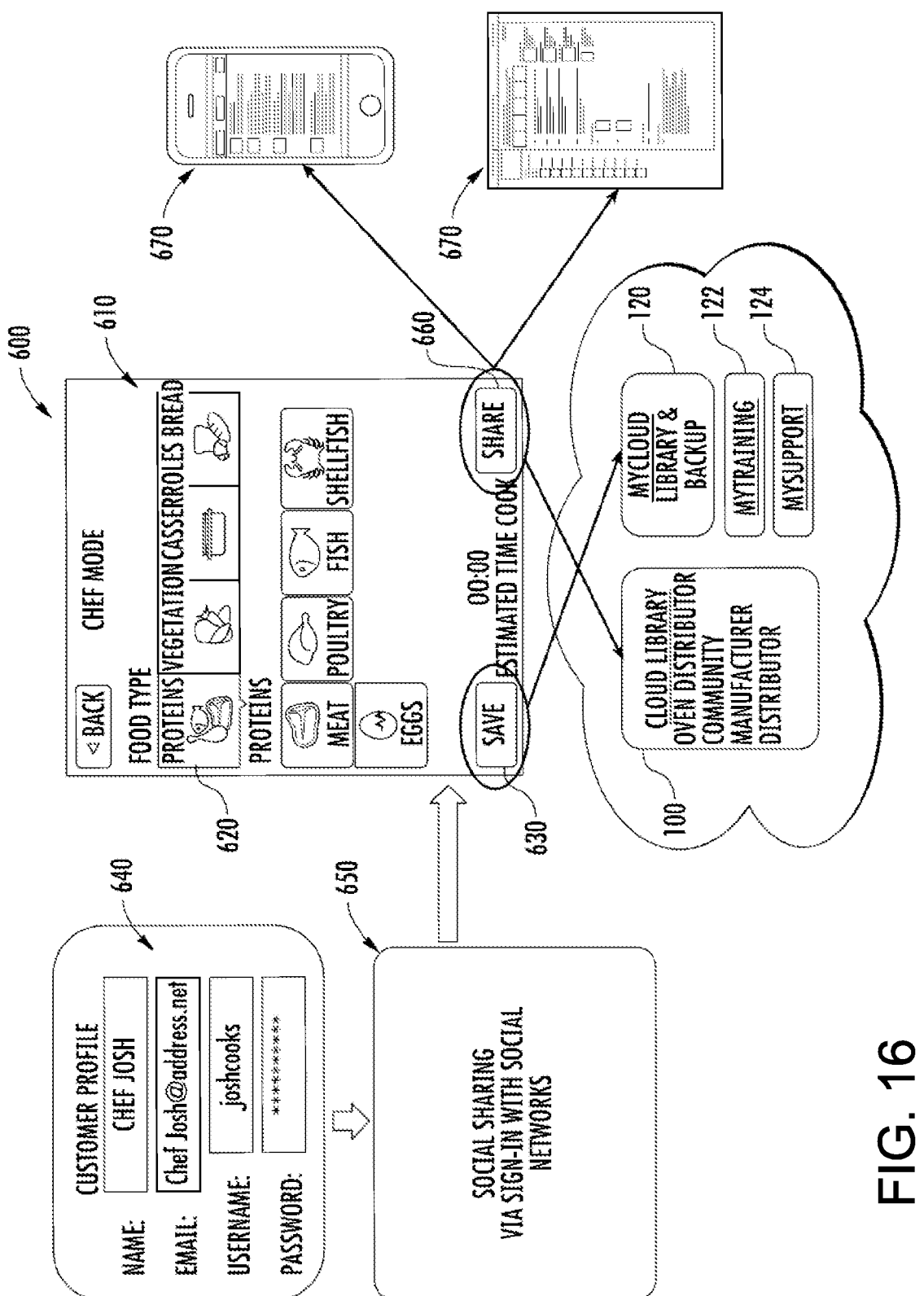
FIG. 16 illustrates an example of direct integration of the oven into the system according to an example embodiment.

Example embodiments may also provide for easy integration with the ovens themselves in situations where the ovens are capable of being online with or at least accessible via the network 30. FIG. 16 illustrates an example of how the oven may be directly integrated into the system 10. In this regard, for example, an oven control console 600 is displayed. The details of the workings and/or display capabilities of the oven control console may vary in different embodiments, and thus, the oven control console 600 of FIG. 16 is merely exemplary. However, the oven control console 600 shows a selection ribbon 610 that is populated with the selections defined for creating a recipe via the icons 620 presented in association with various food types. In an example embodiment, the oven control console 600 may further include a save button 630 that may save the recipe defined to the content manager 44. Thus, for example, the recipe may be saved to the cloud library 100 or to a private cloud (e.g., My Cloud Library 120). In some embodiments, the chef or other individual creating the recipe may be signed or logged in and may therefore be associated with a customer profile 640. The customer profile 640 may also have an association with one or more social networking sites 650. The oven control console 600 may further include a share button 660. By selecting the share button 660, the recipe defined (e.g., in the selection ribbon 610), or comments/status reports associated with generation of the recipe, may be shared via one or more of the social networking sites 650 in a message posting 670. Thus, social interaction may be directly initiated based on activity at the oven via tools provided by the system 10.

Example embodiments may also define channels for mass market engagement between distributors and manufacturers and potential customers that may be community members.

Figure 17:
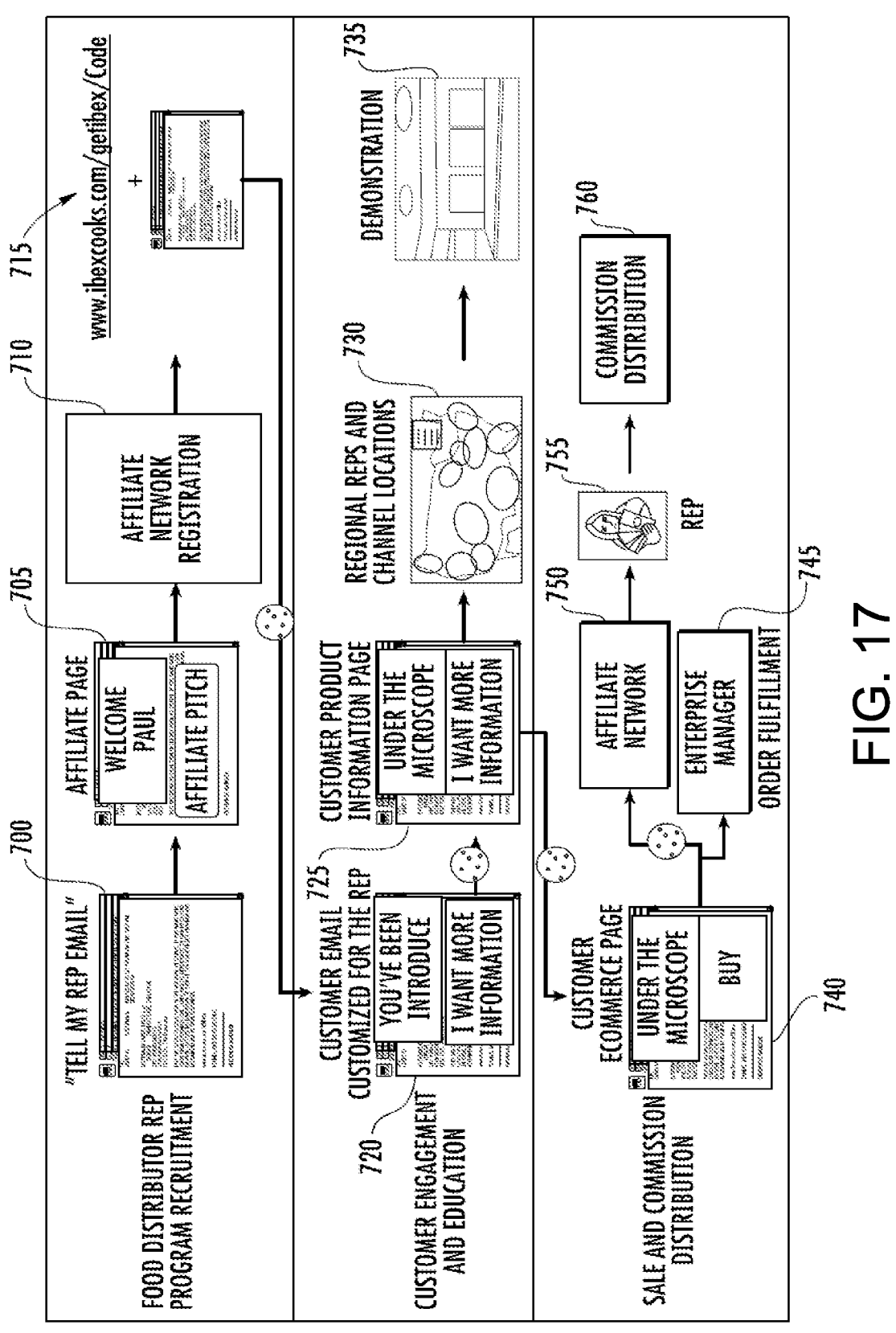
FIG. 17 illustrates an example series of activities that may be associated with one channel concept implementation according to an example embodiment.

FIG. 17 illustrates an example series of activities that may be associated with one channel concept implementation. In this regard, a lead or message, which may indicate an interest expressed in a product of a distributor by a potential customer, may be generated and sent to the distributor at operation 700. A pitch may also be provided to encourage the distributor to become an affiliate at operation 705. The affiliate may register at operation 710 and may be recorded into a registry of affiliates at operation 715. Thereafter, customer emails may be customized for representatives of the distributor at operation 720 for use in facilitating engagement with customers. Product information pages may also be generated at operation 725 in order to provide information for customers. An organizational chart of representatives may be provided at operation 730 to facilitate proper routing of messages when customer interest is expressed. Demonstrations may be provided at operation 735. AT operation 740, sales and distribution related activity may be commenced by preparing customer ecommerce pages. Orders and other customer activity may be reported to the enterprise manager at operation 745 and routed via the affiliate network at operation 750. Representatives may be engaged accordingly at operation 755 and then at operation 760, and commissions that are due may be provided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A content distribution system in an enterprise management network defining a community of members, the system comprising:

a content distribution platform comprising processing circuitry, the content distribution platform hosting a cloud library, the cloud library including a plurality of content items related to food preparation; and a plurality of ovens in communication with the content distribution platform via the network, each of the ovens comprising a user terminal configured to generate control console interfaces for defining a first recipe to share as one of the plurality of content items and for selecting a second recipe for execution among the plurality of content items, wherein each of the ovens is associated with a tag, wherein the tag defines an association between a respective one of the ovens and a characteristic of the respective one of the ovens, wherein, responsive to a request for one or more of the plurality of content items from a requesting oven, the content distribution platform is configured to distribute one or more of the plurality of content items based on the tag to the oven and at least one other selected oven, wherein the first recipe is defined at the oven via an instance of the user terminal at the oven and distributed to the at least one other selected oven and selected for execution via an instance of the user terminal at the at least one other selected oven as the second recipe to heat a food product in the at least one other selected oven based on the second recipe, and wherein at least one of the control interfaces controls the at least one other selected oven to transmit RF energy into a heating chamber of the at the at least one other selected oven responsive to receiving the second recipe, and wherein at least one of the control console interfaces comprises a recipe box including the first recipe, and a hierarchical listing of ovens at a selected restaurant, along with a listing of restaurants in a selected region among a group of regions such that the first recipe is dragged from the recipe box to one of the ovens in the hierarchical listing of ovens to share the first recipe with only the one of the ovens, to the selected restaurant to share the first recipe with all the hierarchical listing of ovens at the selected restaurant, and to the selected region to share the first recipe with all ovens of the listing of restaurants in the selected region.

2. The system of claim 1, wherein the cloud library is a public cloud library available to all of the members of the community.

3. The system of claim 1, wherein the cloud library is a private cloud library associated with a particular organization, and wherein the tag indicates whether the requesting oven is associated with the particular organization and authorized to receive the one or more of the plurality of content items requested.

4. The system of claim 1, wherein some of the plurality of content items are stored in a public cloud library section and others of the plurality of content items are stored in a private cloud library, wherein the public cloud library section is accessible by all of the members of the community, and wherein the private cloud library section accessible only by assets associated with a particular organization.

5. The system of claim 1, wherein the characteristic is location, function, asset type, or organization.

6. The system of claim 1, wherein the tag identifies a specific target for maintenance or a software update.

7. The system of claim 1, wherein the tag identifies a specific target for a content item or an offer.

8. The system of claim 1, wherein the tag is associated with a group of assets, and wherein all of the assets of the group of assets are associated with the group based on their respective tags.

9. The system of claim 1, wherein, responsive to a request for a service from the requesting oven, the content distribution platform is configured to distribute the service to the requesting oven based on the tag.

10. The system of claim 1, wherein the tag is generated by the content distribution platform responsive to extraction of profile information from the respective one of the ovens.

11. The system of claim 10, wherein the tag is automatically generated by the content distribution platform in response to receipt of the profile information.

12. A content distribution platform comprising processing circuitry, the content distribution platform hosting a cloud library, the cloud library including a plurality of content items related to food preparation, wherein the content distribution platform is configured to communicate with a plurality of ovens via a network, each of the ovens comprising a user terminal configured to generate control console interfaces for defining a first recipe to share as one of the plurality of content items and for selecting a second recipe for execution among the plurality of content items, wherein each of the ovens is associated with a tag, wherein the tag defines an association between a respective one of the ovens and a characteristic of the respective one of the ovens, wherein, responsive to a request for one or more of the plurality of content items from a requesting oven, the content distribution platform is configured to distribute one or more of the plurality of content items based on the tag to the oven and at least one other selected oven, wherein the first recipe is defined at the oven via an instance of the user terminal at the oven and distributed to the at least one other selected oven and selected for execution via an instance of the user terminal at the at least one other selected oven as the second recipe to heat a food product in the at least one other selected oven based on the second recipe, and wherein at least one of the control interfaces controls the at least one other selected oven to transmit RF energy into a heating chamber of the at the at least one other selected oven responsive to receiving the second recipe, and wherein at least one of the control console interfaces comprises a recipe box including the first recipe, and a hierarchical listing of ovens at a selected restaurant, along with a listing of restaurants in a selected region among a group of regions such that the first recipe is dragged from the recipe box to one of the ovens in the hierarchical listing of ovens to share the first recipe with only the one of the ovens, to the selected restaurant to share the first recipe with all the hierarchical listing of ovens at the selected restaurant, and to the selected region to share the first recipe with all ovens of the listing of restaurants in the selected region.

13. The content distribution platform of claim 12, wherein the cloud library is a public cloud library available to all members of the community.

14. The content distribution platform of claim 12, wherein the cloud library is a private cloud library associated with a particular organization, and wherein the tag indicates whether the requesting oven is associated with the particular organization and authorized to receive the one or more of the plurality of content items requested.

15. The content distribution platform of claim 12, wherein some of the plurality of content items are stored in a public cloud library section and others of the plurality of content items are stored in a private cloud library, wherein the public cloud library section is accessible by all members of the community, and wherein the private cloud library section accessible only by assets associated with a particular organization.

16. The content distribution platform of claim 12, wherein the characteristic is location, function, asset type, or organization.

17. The content distribution platform of claim 12, wherein the tag identifies a specific target for maintenance or a software update, or wherein the tag identifies a specific target for a content item or an offer.

18. The content distribution platform of claim 12, wherein the tag is associated with a group of assets, and wherein all of the assets of the group of assets are associated with the group based on their respective tags.

19. The content distribution platform of claim 12, wherein, responsive to a request for a service from the requesting oven, the content distribution platform is configured to distribute the service to the requesting oven based on the tag.

\* \* \* \* \*